US009836118B2

(12) United States Patent
Steele

(10) Patent No.: US 9,836,118 B2
(45) Date of Patent: Dec. 5, 2017

(54) METHOD AND SYSTEM FOR ANALYZING A MOVEMENT OF A PERSON

(71) Applicant: Wilson Steele, Huntington Beach, CA (US)

(72) Inventor: Wilson Steele, Huntington Beach, CA (US)

( * ) Notice: Subject to any disclaimer, the term of this patent is extended or adjusted under 35 U.S.C. 154(b) by 24 days.

(21) Appl. No.: 14/741,065

(22) Filed: Jun. 16, 2015

(65) Prior Publication Data

US 2016/0370854 A1 Dec. 22, 2016

(51) Int. Cl.
*G06F 3/01* (2006.01)

(52) U.S. Cl.
CPC .................................. *G06F 3/011* (2013.01)

(58) Field of Classification Search
CPC ......... A61B 5/11; A61B 5/112; A61B 5/4851; A61B 5/1114; A61B 5/1127; A61B 5/1128
See application file for complete search history.

(56) References Cited

U.S. PATENT DOCUMENTS

| 3,973,332 | A | 8/1976 | Slomski |
| 4,112,463 | A | 9/1978 | Kamin |
| 4,128,316 | A | 12/1978 | Zanoni |
| 4,136,387 | A | 1/1979 | Sullivan et al. |
| 4,137,566 | A | 1/1979 | Haas et al. |
| 4,146,924 | A | 3/1979 | Birk et al. |
| 4,163,941 | A | 8/1979 | Linn |
| 4,172,661 | A | 10/1979 | Marcus et al. |
| 4,197,855 | A | 4/1980 | Lewin |
| 4,236,180 | A | 11/1980 | Cayzac |
| 4,238,828 | A | 12/1980 | Hay et al. |
| 4,281,342 | A | 7/1981 | Ueda et al. |
| 4,307,608 | A | 12/1981 | Useldinger et al. |
| 4,375,674 | A | 3/1983 | Thornton |
| 4,416,293 | A | 11/1983 | Anderson et al. |
| 4,667,513 | A | 5/1987 | Konno |
| 4,813,436 | A | 3/1989 | Au |
| 4,836,033 | A | 6/1989 | Seitz |

(Continued)

FOREIGN PATENT DOCUMENTS

| CN | 101341515 B | 10/2011 |
| CN | 102460134 B | 1/2014 |

(Continued)

OTHER PUBLICATIONS

Alexander et al: "Effect of Synchronization Error Between Force and Position Data in Moment Calculations" (Gait & Posture, vol. 5, Issue 2, Apr. 1997, p. 177).

(Continued)

*Primary Examiner* — Sean Dougherty
(74) *Attorney, Agent, or Firm* — Cislo & Thomas, LLP

(57) ABSTRACT

A system and method for analyzing movement of a person includes: measuring kinetic data as the person ambulates with a pair of removable force sensors affixed to a person's ankles, feet, shoes or lower-limb prosthesis with each of the pair of force sensors on a different one of the person's ankle, feet, shoes or lower-limb prosthesis; obtaining kinematic data as the person ambulates with at least one video camera that video records the person ambulating without markers; and temporally synchronizing the kinetic data and the kinematic data together.

19 Claims, 14 Drawing Sheets

(56) References Cited

U.S. PATENT DOCUMENTS

| | | |
|---|---|---|
| 4,843,568 A | 6/1989 | Krueger et al. |
| 4,882,677 A | 11/1989 | Curran |
| 4,971,069 A | 11/1990 | Gracovetsky |
| 5,033,291 A | 7/1991 | Podoloff et al. |
| 5,086,404 A | 2/1992 | Claussen |
| 5,203,346 A | 4/1993 | Fuhr et al. |
| 5,209,240 A | 5/1993 | Jain et al. |
| 5,337,757 A | 8/1994 | Jain et al. |
| 5,408,873 A | 4/1995 | Schmidt et al. |
| 5,441,047 A | 8/1995 | David et al. |
| 5,462,065 A | 10/1995 | Cusimano |
| 5,482,048 A | 1/1996 | Johnson |
| 5,490,221 A | 2/1996 | Ransford et al. |
| 5,524,645 A | 6/1996 | Wills |
| 5,657,426 A | 8/1997 | Waters et al. |
| 5,748,199 A | 5/1998 | Palm |
| 5,802,220 A | 9/1998 | Black et al. |
| 5,808,540 A | 9/1998 | Wheeler et al. |
| 5,818,959 A | 10/1998 | Webb et al. |
| 5,852,669 A | 12/1998 | Eleftheriadis et al. |
| 5,855,818 A | 1/1999 | Gan et al. |
| 5,987,154 A | 11/1999 | Gibbon et al. |
| 5,989,700 A | 11/1999 | Krivopal |
| 6,014,133 A | 1/2000 | Yamakado et al. |
| 6,032,542 A | 3/2000 | Warnick et al. |
| 6,047,078 A | 4/2000 | Kang |
| 6,056,671 A | 5/2000 | Marmer |
| 6,081,273 A | 6/2000 | Weng et al. |
| 6,122,846 A | 9/2000 | Gray et al. |
| 6,195,921 B1 | 3/2001 | Truong |
| 6,216,545 B1 | 4/2001 | Taylor |
| 6,231,527 B1 | 5/2001 | Sol |
| 6,301,964 B1 | 10/2001 | Fyfe et al. |
| 6,514,219 B1 | 2/2003 | Guimond et al. |
| 6,543,299 B2 | 4/2003 | Taylor |
| 6,552,729 B1 | 4/2003 | Di Bernardo et al. |
| 6,580,812 B1 | 6/2003 | Harrington |
| 6,674,877 B1 | 1/2004 | Jojic et al. |
| 6,697,502 B2 | 2/2004 | Luo |
| 6,744,914 B1 | 6/2004 | Rubbert et al. |
| 6,821,257 B1 | 11/2004 | Jolley |
| 6,836,744 B1 | 12/2004 | Asphahani et al. |
| 6,904,801 B1 | 6/2005 | Bridges et al. |
| 6,931,938 B2 | 8/2005 | Knirck et al. |
| 7,006,683 B2 | 2/2006 | Brand |
| 7,027,642 B2 | 4/2006 | Rubbert et al. |
| 7,074,168 B1 | 7/2006 | Farnes et al. |
| 7,156,792 B2 | 1/2007 | Gibson-Horn |
| 7,179,234 B2 | 2/2007 | Nashner |
| 7,197,179 B2 | 3/2007 | Rubbert et al. |
| 7,201,063 B2 | 4/2007 | Taylor |
| 7,219,033 B2 | 5/2007 | Kolen |
| 7,239,718 B2 | 7/2007 | Park et al. |
| 7,317,836 B2 | 1/2008 | Fujimura et al. |
| 7,379,584 B2 | 5/2008 | Rubbert et al. |
| 7,420,472 B2 | 9/2008 | Tran |
| 7,421,101 B2 | 9/2008 | Georgescu et al. |
| 7,447,337 B2 | 11/2008 | Zhang et al. |
| 7,457,457 B2 | 11/2008 | Ives et al. |
| 7,492,268 B2 | 2/2009 | Ferguson et al. |
| 7,502,498 B2 | 3/2009 | Wen et al. |
| 7,526,071 B2 | 4/2009 | Drapeau |
| 7,532,744 B2 | 5/2009 | Sharoni et al. |
| 7,539,532 B2 | 5/2009 | Tran |
| 7,539,533 B2 | 5/2009 | Tran |
| 7,558,622 B2 | 7/2009 | Tran |
| 7,623,944 B2 | 11/2009 | Dariush |
| 7,628,074 B2 | 12/2009 | Vannucci et al. |
| 7,657,084 B2 | 2/2010 | Ives et al. |
| 7,684,896 B2 | 3/2010 | Dariush |
| 7,706,602 B2 | 4/2010 | Nakashima |
| 7,708,673 B2 | 5/2010 | Gibson-Horn |
| 7,716,005 B2 | 5/2010 | Shoureshi et al. |
| 7,770,473 B2 | 8/2010 | Von Lilienfeld-Toal et al. |
| 7,794,370 B2 | 9/2010 | Tackett |
| 7,857,771 B2 | 12/2010 | Alwan et al. |
| 7,907,774 B2 | 3/2011 | Parr et al. |
| 7,980,141 B2 | 7/2011 | Connor et al. |
| 7,980,856 B2 | 7/2011 | Grabiner et al. |
| 8,102,390 B2 | 1/2012 | Tapang |
| 8,111,165 B2 | 2/2012 | Ortega et al. |
| 8,122,772 B2 | 2/2012 | Clausen |
| 8,126,736 B2 | 2/2012 | Anderson et al. |
| 8,139,067 B2 | 3/2012 | Anguelov et al. |
| 8,139,822 B2 | 3/2012 | Selner |
| 8,165,844 B2 | 4/2012 | Luinge et al. |
| 8,180,714 B2 | 5/2012 | Corazza et al. |
| 8,215,186 B2 | 7/2012 | Macomber et al. |
| 8,215,773 B2 | 7/2012 | Gibson-Horn et al. |
| 8,265,730 B2 * | 9/2012 | Alexander ............ A61B 5/1114 600/410 |
| 8,323,188 B2 | 12/2012 | Tran |
| 8,323,189 B2 | 12/2012 | Tran et al. |
| 8,328,718 B2 | 12/2012 | Tran |
| 8,393,229 B2 | 3/2013 | Tao et al. |
| 8,409,297 B2 | 4/2013 | Boone et al. |
| 8,421,642 B1 * | 4/2013 | McIntosh ................ G06F 3/017 340/539.1 |
| 8,425,415 B2 | 4/2013 | Tran |
| 8,449,471 B2 | 5/2013 | Tran |
| 8,452,080 B2 | 5/2013 | Engedal |
| 8,461,988 B2 | 6/2013 | Tran |
| 8,467,574 B2 | 6/2013 | Mathe et al. |
| 8,471,848 B2 | 6/2013 | Tschesnok |
| 8,475,368 B2 | 7/2013 | Tran et al. |
| 8,500,636 B2 | 8/2013 | Tran |
| 8,503,720 B2 | 8/2013 | Shotton et al. |
| 8,525,673 B2 | 9/2013 | Tran |
| 8,525,687 B2 | 9/2013 | Tran |
| 8,527,217 B2 | 9/2013 | Moodie |
| 8,531,291 B2 | 9/2013 | Tran |
| 8,551,026 B2 | 10/2013 | Alwan et al. |
| 8,565,479 B2 | 10/2013 | Gurman et al. |
| 8,622,747 B2 | 1/2014 | Chu et al. |
| 8,652,038 B2 | 2/2014 | Tran et al. |
| 8,659,596 B2 | 2/2014 | Corazza et al. |
| 8,661,915 B2 | 3/2014 | Taylor |
| 8,668,386 B2 | 3/2014 | Morton et al. |
| 8,684,900 B2 | 4/2014 | Tran |
| 8,684,922 B2 | 4/2014 | Tran |
| 8,685,093 B2 | 4/2014 | Anderson et al. |
| 8,687,765 B2 | 4/2014 | Kotowski et al. |
| 8,698,888 B2 | 4/2014 | Bonnet |
| 8,708,903 B2 | 4/2014 | Tran |
| 8,727,978 B2 | 5/2014 | Tran et al. |
| 8,737,767 B2 | 5/2014 | Hodgins et al. |
| 8,747,313 B2 | 6/2014 | Tran et al. |
| 8,747,336 B2 | 6/2014 | Tran |
| 8,749,115 B2 | 6/2014 | Pas et al. |
| 8,750,971 B2 | 6/2014 | Tran |
| 8,758,272 B2 | 6/2014 | Kubiak et al. |
| 8,758,273 B2 | 6/2014 | Kubiak et al. |
| 8,764,651 B2 | 7/2014 | Tran |
| 8,784,502 B2 | 7/2014 | Macomber et al. |
| 8,800,386 B2 | 8/2014 | Taylor |
| 8,845,494 B2 | 9/2014 | Whitall et al. |
| 8,870,795 B2 | 10/2014 | Kim et al. |
| 8,904,876 B2 | 12/2014 | Taylor et al. |
| 9,140,717 B2 * | 9/2015 | Perkins ................. G01C 21/16 |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0155962 A1 | 8/2004 | Marks |
| 2004/0186358 A1 * | 9/2004 | Chernow ............ A61B 5/0002 600/300 |
| 2004/0259690 A1 | 12/2004 | Frykman et al. |
| 2005/0000298 A1 | 1/2005 | Pfeifer et al. |
| 2005/0078178 A1 | 4/2005 | Brown et al. |
| 2005/0184878 A1 | 8/2005 | Grold et al. |
| 2005/0265583 A1 | 12/2005 | Covell |
| 2006/0245618 A1 | 11/2006 | Boregowda et al. |
| 2006/0267978 A1 | 11/2006 | Litke et al. |

(56) References Cited

U.S. PATENT DOCUMENTS

| | | | |
|---|---|---|---|
| 2007/0104351 A1 | 5/2007 | Yang et al. | |
| 2007/0204687 A1 | 9/2007 | Haselhurst et al. | |
| 2007/0250287 A1 | 10/2007 | Spector | |
| 2007/0275830 A1 | 11/2007 | Lee | |
| 2008/0191864 A1 | 8/2008 | Wolfson | |
| 2008/0221487 A1* | 9/2008 | Zohar | A61B 5/103 600/595 |
| 2009/0031825 A1 | 2/2009 | Kishida et al. | |
| 2009/0213123 A1 | 8/2009 | Crow | |
| 2009/0252423 A1 | 10/2009 | Zhu et al. | |
| 2010/0023345 A1 | 1/2010 | Schottlander | |
| 2010/0076563 A1* | 3/2010 | Otto | A61B 5/103 623/20.14 |
| 2010/0162832 A1 | 7/2010 | Brauers | |
| 2010/0278405 A1 | 11/2010 | Kakadiaris et al. | |
| 2011/0004126 A1 | 1/2011 | Einav et al. | |
| 2011/0112397 A1* | 5/2011 | Shen | A61B 19/5244 600/424 |
| 2011/0221457 A1 | 9/2011 | Takahashi et al. | |
| 2011/0249865 A1 | 10/2011 | Lee et al. | |
| 2011/0288448 A1 | 11/2011 | Sanders et al. | |
| 2011/0292036 A1 | 12/2011 | Sali et al. | |
| 2012/0004579 A1* | 1/2012 | Luo | A61B 5/04888 600/595 |
| 2012/0119904 A1 | 5/2012 | Coleman Boone et al. | |
| 2012/0137795 A1 | 6/2012 | Selner | |
| 2012/0191017 A1 | 7/2012 | Huang | |
| 2012/0253234 A1 | 10/2012 | Yang et al. | |
| 2012/0255160 A1 | 10/2012 | Boone et al. | |
| 2012/0274442 A1 | 11/2012 | Mottram | |
| 2012/0276999 A1 | 11/2012 | Kalpaxis et al. | |
| 2013/0123665 A1 | 5/2013 | Mariani et al. | |
| 2013/0123667 A1 | 5/2013 | Komatireddy et al. | |
| 2013/0190135 A1 | 7/2013 | Pryor | |
| 2014/0039657 A1 | 2/2014 | Spector | |
| 2014/0090488 A1 | 4/2014 | Taylor et al. | |
| 2014/0090489 A1 | 4/2014 | Taylor et al. | |
| 2014/0182391 A1 | 7/2014 | Huang et al. | |
| 2014/0230563 A1 | 8/2014 | Huang | |
| 2014/0296997 A1* | 10/2014 | Herr | A61F 2/68 623/24 |
| 2014/0343460 A1 | 11/2014 | Evans, III et al. | |
| 2015/0038878 A1* | 2/2015 | Pusch | A61B 5/1036 600/587 |
| 2015/0213193 A1* | 7/2015 | Apte | C12Q 1/6888 435/6.12 |

FOREIGN PATENT DOCUMENTS

| | | |
|---|---|---|
| DE | 10-2010/01789 A1 | 10/2011 |
| EP | 0742597 A1 | 11/1996 |
| EP | 1714612 A2 | 10/2006 |
| EP | 1935379 A2 | 6/2008 |
| EP | 2042847 A1 | 4/2009 |
| EP | 2484281 A1 | 8/2012 |
| EP | 2674913 B1 | 7/2014 |
| FR | 2776175 A1 | 9/1999 |
| JP | 2003/337071 A | 11/2003 |
| JP | 2010/122018 A | 6/2010 |
| WO | WO 94/15530 A1 | 7/1994 |
| WO | WO 2004/008095 A2 | 1/2004 |
| WO | WO 2004/066821 A2 | 8/2004 |
| WO | WO 2004/092744 A2 | 10/2004 |
| WO | WO 2005/003902 A2 | 1/2005 |
| WO | WO 2006/078538 A2 | 7/2006 |
| WO | WO 2006/078566 A2 | 7/2006 |
| WO | WO 2006/119186 A2 | 11/2006 |
| WO | WO 2007/072246 A1 | 6/2007 |
| WO | WO 2008/042903 A2 | 4/2008 |
| WO | WO 2008/102308 A2 | 8/2008 |
| WO | WO 2008/103181 A1 | 8/2008 |
| WO | WO 2008/109567 A3 | 11/2008 |
| WO | WO 2009/070782 A1 | 6/2009 |
| WO | WO 2009/089204 A2 | 7/2009 |
| WO | WO 2009/120270 A2 | 10/2009 |
| WO | WO 2010/135620 A2 | 11/2010 |
| WO | WO 2011/026001 A2 | 3/2011 |
| WO | WO 2011/053839 A2 | 5/2011 |
| WO | WO 2012/014714 A1 | 2/2012 |
| WO | WO 2012/060578 A2 | 5/2012 |
| WO | WO 2012/171967 A2 | 12/2012 |
| WO | WO 2013/022890 A1 | 2/2013 |
| WO | WO 2013/132129 A1 | 9/2013 |
| WO | WO 2013/186010 A1 | 12/2013 |
| WO | WO 2014/068269 A1 | 5/2014 |
| WO | WO 2014/100045 A1 | 6/2014 |
| WO | WO 2014/135187 A1 | 9/2014 |

OTHER PUBLICATIONS

Ayyappa; "Normal Human Locomotion, Part 1: Basic Concepts and Terminology." Journal of Prosthetics and Orthotics (1997); vol. 9, No. 1; 10 pages.

Chesnin et al.: "Comparison of an in-shoe Pressure Measurement Device to a Force Plate: CoP Measurement Validity;" Gait & Posture, vol. 12, Issue 2, Oct. 1, 2000, pp. 128-133.

Ganeriwal et al.; "Timing-Sync Protocol for Sensor Networks;" The First ACM Conference on Embedded Networked Sensor Systems (SenSys), University of California (2003); p. 138-149 (12 pages).

Kepple et al.: "Relative Contributions of the Lower Extremity Joint Moments Forward Progression and Support During Gait;" Gait & Posture 6 (1997); pp. 1-8.

Martin et al.: "Volumetric Descriptions of Objects from Multiple Views," IEEE Transactions on Pattern Analysis and Machine Intelligence, Mar. 1983; vol. Pami-5, No. 2; pp. 150-158.

Mori et al.: "Insole-Type Simultaneous Measurement System of Plantar Pressure and Shear Force During Gait for Diabetic Patients;" Journal of Robotics and Mechatronics, vol. 24, No. 5; University of Toyko, 2012; pp. 766-772.

Neptune et al.; "Muscle force redistributes segmental power for body progression during walking;" Gait & Posture (19), 2004; pp. 194-205.

Niem: "Robust and Fast Modeling of 3D Natural Objects from Multiple Views;" Proceedings 'Image and Video Processing II'; 2004, 10 pages.

Riley et al.: "Propulsive adaptation to changing gait speed;" Journal of Biomechanics 34 (2001); pp. 197-202.

Roche; "Time Synchronization in Wireless Networks;" Washington University in St. Louis; 2006; 12 pages; http://www.cs.wustl.edu/~jain/cse57406/ftp/time_sync/index.html.

Samson et al; "A Portable System for Foot Biomechanical Analysis During Gait;" Gait & Posture vol. 40 (2014); pp. 420-428.

Siegel: "Using induced accelerations to understand knee stability during gait of individuals with muscle weakness;" Gait & Posture 23 (2006); pp. 435-440.

Steele et al.: "Acceleration Analysis to Quantify Compensation in Amputee Gait: The Effect of Prosthetic Foot Position in a Trans-Tibial Amputee;" Mar. 2007 Procedings of American Academy of Orthotists and Prosthetists.

Talaty: "Computer Modeling and Simulation in Gait Analysis;" PM&R: State of the Art Reviews; (2002).

Van Den Bogert et al.; "A Weighted Least-Squares Method for Inverse Dynamic Analysis;" Computer Methods in Biomechanics and Biomedical Engineering, vol. 11, No. 1; pp. 3-9; MSL Academic Endeavors (2008).

Wassom et al: "Vertical Jump Measurement Techniques Using Markerless 3d Motion Capture and Inertial Sensors" *Medicine and Science in Sports and Exercise* vol. 45. No. 5. (2013).

Zajac; "Determining Muscle's Force and Action in Multi-Articular Movement;" Exercise in Sport and Science Reviews (1989); vol. 17, pp. 187-230.

\* cited by examiner

Initial Contact (IC)   Foot Flat (FF)   Heel Off (HO)

METHOD AND SYSTEM FOR ANALYZING A MOVEMENT OF A PERSON

BACKGROUND

Field of the Invention

The present invention relates generally to analyzing a person's movement, such as gait. More particularly, the present invention relates to a method and a system to record synchronized 3D kinematic and kinetic data as a person ambulates.

Related Art

Current gait lab configurations utilize a force plate that is built into the floor or otherwise requires a dedicated room and considerable time and expertise to set up. The force plate and set-up time can be expensive. In addition, the force plate constrains the patient to a straight line of motion or walking.

SUMMARY OF THE INVENTION

It has been recognized that it would be advantageous to develop a method and an apparatus, or a gait lab, for determining, documenting and improving the functional capability of a patient that is quickly and easily set up, portable, inexpensive, and that records full body kinematic (visual) and kinetic (load) data in 3D, and that does not constrain the patient.

The invention provides a mobile gait lab system comprising a pair of force sensors removably affixed to a person's ankles, feet, shoes or lower limb prostheses to measure kinetic data as the person ambulates. Each of the pair of force sensors comprises a four-axis ground reaction sensor configured to sense: 1) pressure force or vertical force, 2) anterior/posterior shear force, 3) medio/lateral shear force, and 4) torque or moment exerted between the person's ankles, feet, shoes or lower-limb prostheses and a support surface. In addition, the system comprises a plurality of video cameras to record markerless kinematic data as the person ambulates. The plurality of video cameras is removably disposed about a predetermined spatial volume. Furthermore, the system comprises a computer with one or more processors configured to temporally synchronize the kinetic data and the kinematic data together.

In addition, the invention provides a method for analyzing movement of a person, the method comprising: 1) measuring 3D kinetic data as the person ambulates with a pair of force sensors affixed to a person's ankles, feet, shoes or lower-limb prostheses with each of the pair of force sensors on a different one of the person's ankle, feet, shoes or lower-limb prostheses; 2) obtaining 3D kinematic data as the person ambulates with at least one video camera that video records the person ambulating without markers; and 3) temporally synchronizing the kinetic data and the kinematic data together.

Furthermore, the invention provides a system for analyzing movement of a person. The system comprises a pair of force sensors to be affixed to a person's ankles, feet, shoes or lower-limb prostheses to measure kinetic data as the person ambulates; at least one video camera configured to record markerless kinematic data as the person ambulates; and one or more processors configured to temporally synchronize the kinetic data and the kinematic data together.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

In FIG. 1, a lumped mass or visual hull or visual blob segment, and a rendering of the video recording of the person ambulating as a three-dimensional stick figure with a plurality of segments representative of a skeletal model of the person, are shown in a predetermined spatial volume along with the person for purposes of illustrating the rendering of the video of the person; but it is understood that they are only displayed on the computer, and not actually in the predetermined spatial volume with the person.

FIGS. 7a-14 are graphs of exemplary reports produced for an exemplary patient by the system and method in accordance with an embodiment of the present invention that can be used to evaluate a patient or amputee, namely using variable cadence, to qualify the patient or amputee for certain levels of care and/or devices;

FIGS. 7a and 7b are graphs of an exemplary report produced for an exemplary patient showing data streams for the body CoM Velocity, and as well both sides of Knee Angle, Knee Angular Velocity and Weighted Foot;

FIG. 8 is a bar graph of an exemplary report produced for an exemplary patient showing variation of walking cadence in steps per minute;

FIG. 9 is a bar graph of an exemplary report produced for an exemplary patient showing variation of walking cadence in steps per minute for both limbs to compare left and right symmetry;

FIG. 10 is a bar graph of an exemplary report produced for an exemplary patient showing level ground walking cadence across three trials;

FIG. 11 is a bar graph of an exemplary report produced for an exemplary patient showing a mid-stance foot coordinate for both feet;

FIG. 12 is a graph of an exemplary report produced for an exemplary patient showing self-selected pace and step length in meters per step;

FIG. 13 is a bar graph of an exemplary report produced for an exemplary patient showing median walking step length in meters;

FIG. 14 is a bar graph of an exemplary report produced for an exemplary patient showing median walking speed in meters per second;

FIG. 15 is a graph of vertical velocity of the center of mass in meters per second;

FIG. 16 is a graph of an L Test showing separating the data stream into different sections that can be given individual time stamps;

FIG. 17 is a graph of an L Test foot strike coordinates and hip projection for both left and right feet;

FIG. 18 is a time-table waterfall chart showing the total time to complete the entire L Test and the individual time that a subject used to complete each component;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

Figure 20:
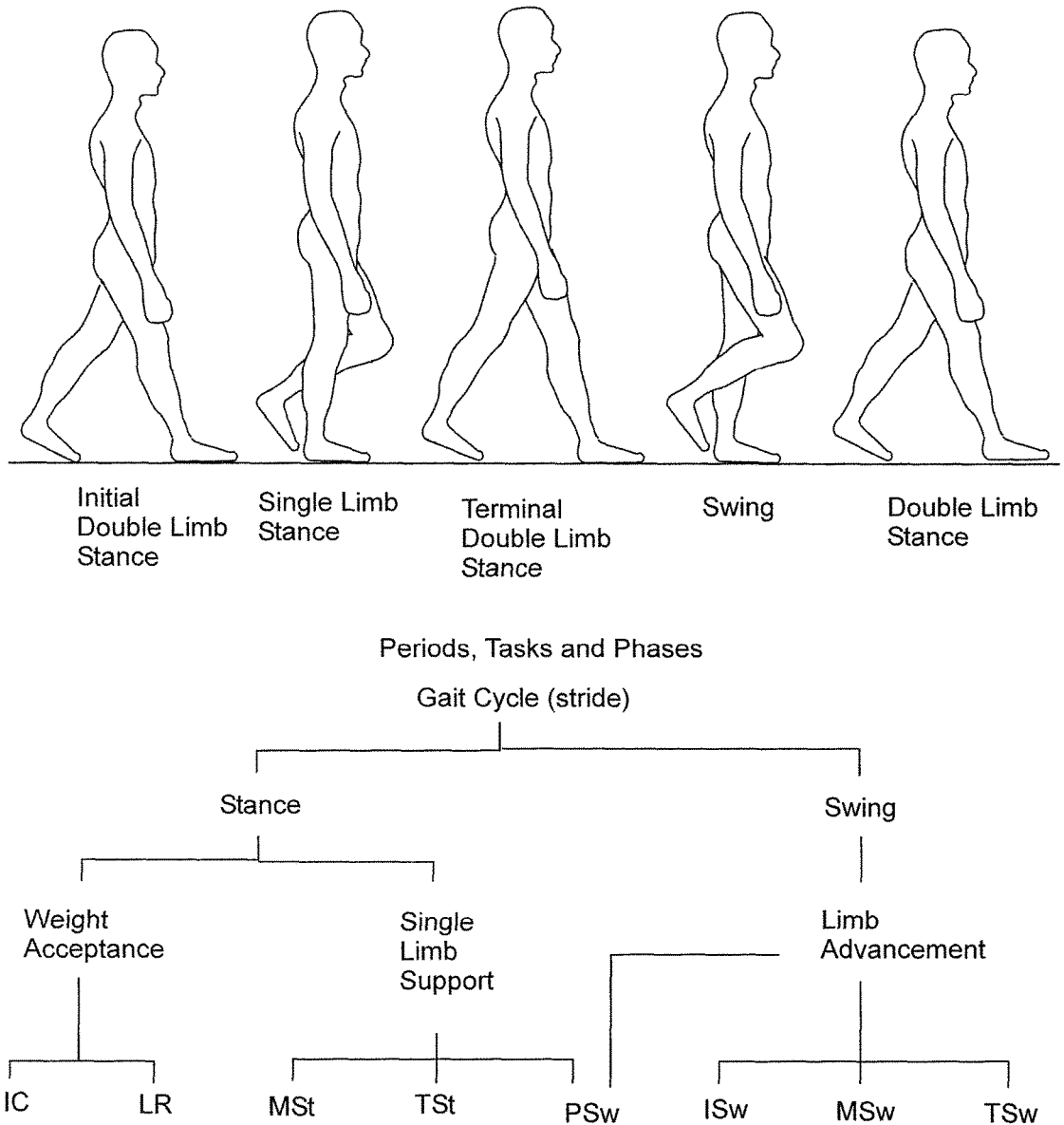
FIGS. 20-22 are schematic views depicting various positions of a person's foot during ambulation or walking for the purpose of definition.
Figure 21:
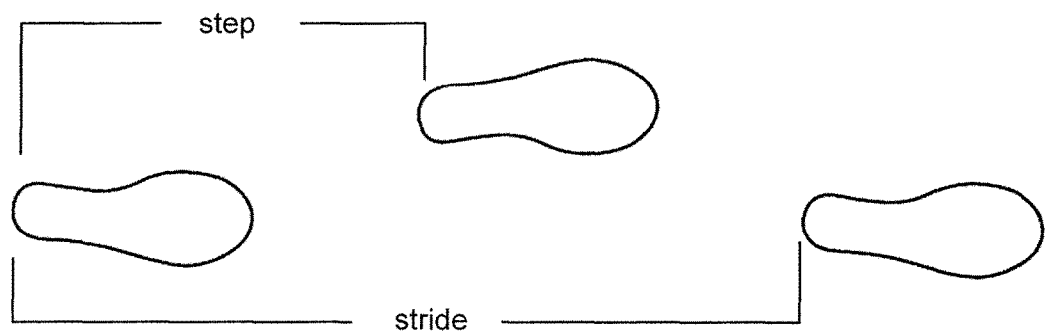
Figure 22:
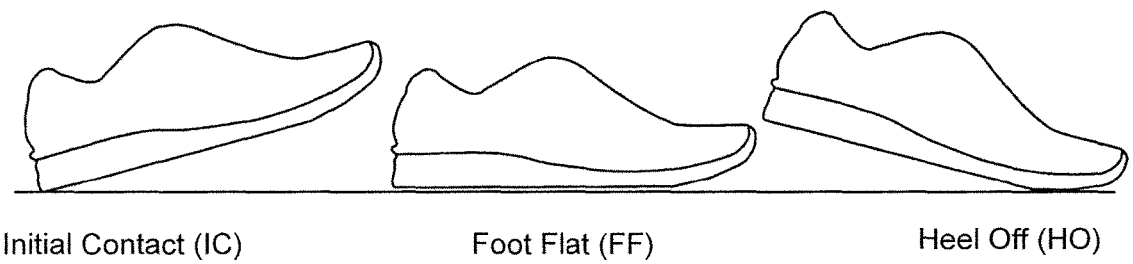

Standard anatomical terminology is used herein, specifically with reference to FIGS. 20-22. The three orthogonal anatomical planes are the sagittal, the frontal, and the transverse planes. A sagittal plane is the vertical plane which divides the body into right and left portions. A frontal plane is the other vertical plane, and is perpendicular to the sagittal plane, dividing the body into front (anterior) and rear (posterior) sections. The frontal plane is also referred to as the coronal plane. The transverse plane is perpendicular to both the sagittal and frontal planes, and divides the body into multiple horizontal slices or cross-sections, named superior (upper) and inferior (lower) sections. Lateral refers to a direction moving away from the body centerline, and medial refers to moving closer to the body centerline. In reference to joint and limb segments, proximal means closer to the Center of Mass (CoM) of the body, and distal means farther from the center of mass of the body. Anterior means toward or from the front of the body, while posterior means toward or from the rear of the body.

Ambulation and gait cycle terminology includes a stride and a step, as shown in FIGS. 21 and 22. A stride is either the time, or the distance, between one gait event and the repetition of that same gait event on the same side of the body. For instance, left heel strike to left heel strike is a stride. A step is the time or distance between a gait event on one side of the body and the same event on the opposite side of the body, as in the case of left heel strike to right heel strike. A step, for any one foot, can be defined from one heel contact to the next heel contact, and thus, includes a stance phase (in contact with the ground) and a swing phase (no contact with the ground).

The term "transceiver" is used herein to refer to a transmitter for transmitting a signal, a receiver for receiving a signal, or both a transmitter and a receiver. The transceiver can both send and receive, or can include a transmitter for transmitting a signal, and a receiver for receiving a signal.

Description

The present invention comprises methods and systems for capturing 3D kinematic (visual) and kinetic (load) data about a moving person, combining those data streams with software, analyzing the movement for functional benefit, and producing a report which quantifies the physical dynamics over a variety of activities. In addition, the invention comprises methods and systems for determining, documenting, and improving the functional capability of a patient with a markerless motion capture and force sensing system. The methods and systems enable an investigator to quickly set up and record full body kinematic and kinetic data, and produce clinically relevant reports that aid in optimization and documentation of patient movement. The invention provides a comprehensive method to take full-body quantitative data, record the position and orientation of each limb in a multi-segment system and the forces that linked segment model exert on the surrounding environment. In one aspect, the markerless motion-capture system can be accompanied by force sensing modules in proximity to the foot. When kinematic (visual) and kinetic (load) data are captured together, highly accurate calculations that quantify movement and joint loading are possible. These calculations can be referred to as Inverse Dynamics. When a complete data set of patient movement is available, advanced analysis techniques can use this data with a forward simulation system to quantify the effect of each joint torque on every other limb segment. These mathematical techniques can be referred to as Intersegmental Dynamics Analysis (IDA). The IDA produces a result that details the accelerations produced by joint torques, which can be referred to as Acceleration Analysis (AA). In one aspect, the method and system can further include obtaining information about the patient's physical properties, such as height, weight, mass distribution, and body fat. The method and system can then adjust a patient-specific table that enables calculation of limb lengths, mass properties and joint centers, to enable more accurate Inverse Dynamics.

In one aspect, the present invention comprises a movement or gait lab to quantify and document the functional level of an amputee. When the patient is an amputee, the patient-specific table of properties can include information on the physical properties of the prosthetic device(s). Functional level can be categorized by multiple activities or standards, such as the capacity for variable cadence, capability to perform activities of daily living (ADLs), or time required to perform certain bench-mark tasks, such as the L Test or Timed Up and Go (TUG) Test.

The method and system can comprise Data Capture Software; Biomechanics Software; Joint Torque (& Power) Calculation; Forward Dynamics Simulation; Acceleration Analysis Software; and Capability Reporting Software. Prior work in gait labs that only use kinematic (visual) data, and that did not include capturing the forces a subject exerts on the environment, compute those forces from acceleration with methods that contribute error to the movement data. Prior work that only captured kinetic data, or forces associated with a limb do not completely depict a subject due to lack of knowledge of the position of limb segments, and most commonly only capture data from one side of the subject, given the example of lower extremity devices. Wrist- or ankle-worn accelerometer-based devices have difficulty distinguishing between activity, and are not able to quantify movement or loading of a specific limb segment, as would be needed for an amputee subject.

The method and system enables a new methodology and a new price point of data analysis and reporting on the capability of a person to perform movements while, at the same time, becomes a system that can hide the complexity from the user by turning large data sets into actionable information.

As illustrated in FIGS. 1-18, a system, indicated generally at 10, in an example implementation in accordance with the invention is shown for analyzing movement (e.g. a gait) of a person 14, or a person's movement (or gait). In one aspect, the person can have all of his or her natural lower limbs (i.e. legs and feet). In another aspect, the person can be an amputee and can have one (or a pair of) lower limb prosthesis(es), or a prosthetic foot, ankle, knee, leg, or combinations thereof. The term "a person's ankles, feet, shoes or lower-limb prosthesis" is intended to encompass any combination of ankle, foot, shoe or prosthesis. In one aspect, the system 10 can be a mobile movement/gait lab that can be capable of being transported and can be capable of being implemented or set up in an existing space or room without modification of the space or room. The system 10 and/or the mobile gait lab can comprise a plurality of markerless video cameras 18, a computer 26 or one or more processors, and a pair of force sensors 30 to capture and synchronize kinematic and kinetic data as the person ambulates (e.g. walks).

The system 10 and/or the mobile movement/gait lab can comprise a plurality of markerless video cameras 18 to capture and record markerless video (kinematic) data of the person as the person ambulates. The plurality of markerless video cameras 18 can be removably disposed about a predetermined spatial volume 22, such as a room or predetermined space. The cameras can be disposed about a perimeter of the volume, and can define the volume or perimeter. The video cameras can be positioned and located to obtain different perspectives or angles of the volume or space. In one aspect, the video cameras can be disposed on stands. In another aspect, the video cameras can be mounted to existing walls. The kinematic data capture system or hardware, or the plurality of video cameras, can be single lens USB cameras, without sensors for sensing video or other markers on the person, or depth sensors (infrared or laser) as used in other types of the system. The person and the person's limbs can be distinguished using computer software, as discussed in greater detail below. Thus, the system and the gait lab can be set up and used with greater ease and speed.

In the preferred embodiment, a markerless motion capture system provides the visual, or kinematic, data to the system. The markerless video cameras do not require knowledgeable and expensive staff to undergo the time consuming process of placing identifying marker balls of LED lights on a subject.

The video cameras can be cheap, robust, high-quality and high-frame rate video cameras. For high-quality motion capture, the cameras can be 60 Hz and can provide a 640×480 capture video. For one preferred embodiment, the cameras can be single lens cameras and can be the USB connected SLEH-00448, or the SLEH-00201, both from Sony.

The cameras can be combined with software packages that are capable of capturing 2D video from two or more viewpoints, and rendering those recordings into a 3D stick figure that represents the long bones of the human body. For example, the iPiSoft system can be used that includes the iPi Recorder, iPi Studio, and iPi Biomechanics export. The general methodology is to take a background image of each viewpoint, record a multiple vantage video section with a subject starting in a known orientation, and then match the subject movement to an animated model by subtracting the background at each frame, and matching the model to the 2D image, from each viewpoint. The work flow typically follows such a progression: video of empty capture volume 22, subject movement video 14, lumped massed (visual hulls) 274, and multi-segment 3D virtual model/skeleton stick figure 266.

In one aspect, each recording session can start with a patient wearing the sensors 30, and standing on a vertical force scale 150 connected to the computer 26 for baseline calibration 142. The user can be asked to stand momentarily with both feet on the scale (indicated at 144 in FIG. 5), and then briefly (several seconds) with each foot extended slightly behind with the toes off the ground for a calibration of that foot (indicated at 146 in FIG. 6). The kinematic (video) system calibration may require the use of quiet standing for a number of seconds at the beginning of a recording. As well, the subject may be asked to bounce on a toe with one leg extended behind, to create a visual and force event, or spike in both the kinematic and kinetic data streams, that could be used for synchronization.

The initial skeleton model 266 used in these systems can consist of a 16-segment human made of 1 Head, 1 Thorax, 1 Abdomen, 1 Pelvis, 2 Thigh, 2 Shank (Leg), 2 Feet, 2 Upper Arms, 2 Lower Arms, and 2 Hands. Multiple other initial models could be used in other embodiments, with more segments 270 added for more detail, at the potential cost of more time to calculate and convert the multiple 2D movement video streams to a 3D model movement.

The methods may further include, via the one or more computers, receiving physical information (indicated at 344 in FIG. 3) about the subject that describes a distance from one joint center to another joint center, or to a reference point. In addition, the methods could also include using joint center data, or long bone length, as an optimizing parameter to improve the accuracy of the captured kinematic data.

In addition, the system 10 and/or the mobile movement/gait lab can comprise a computer 26 with one or more processors. The computer 26 can comprise a laptop computer, a tablet computer, a desktop computer, a modified laptop computer with additional ports and/or wireless capabilities, a modified tablet computer with additional ports and/or wireless capabilities, multiple computers, etc. The computer can have one or more wireless transceivers (e.g. Bluetooth and/or wireless local area networks (LAN) transceivers), and/or one or more data ports (e.g. USB ports). The computer can have an internal and/or an external data storage device (e.g. disk drives or flash memory). The computer can have a visual display, such as a monitor, and data input, such as a keyboard or touch screen. The computer can have one or more (fixed or base) processors 28, as discussed in greater detail below. In one aspect, the plurality of video cameras can be wired-ly coupled to the computer, such as through USB ports (or a USB bus with a plurality of ports). In another aspect, the plurality of video cameras can be wirelessly coupled to the computer.

Furthermore, the system 10 and/or the mobile movement/gait lab can comprise a pair of force sensors 30 removably affixed to a person's ankles, feet, shoes or lower limb prostheses (all indicated at 34) to measure force and shear (kinetic) data as the person ambulates. As stated above, the term "a person's ankles, feet, shoes or lower-limb prosthesis" is intended to encompass any combination of ankle, foot, shoe or prosthesis. The sensors can be foot-borne sensors. The sensors can be affixed to each of the person's feet/foot, ankle(s), shoe(s), prosthetic(s), or combinations thereof depending upon the person. For example, a pair of sensors can be affixed to the person's respective ankles, shoes or feet. As another example, a pair of sensors can be affixed to the person's respective prosthetic and ankle, shoe or foot. Thus, each lower limb (foot, shoe, ankle or prosthetic) of the person has a sensor affixed thereto. The sensors 30 measure force and shear (kinetic) data as the person walks. In one aspect, the sensor can be a four-axis ground reaction sensor configured to sense: 1) pressure force or vertical force, 2) anterior/posterior shear force, 3) medio/lateral shear force, and 4) torque or moment exerted between the person's ankles, feet, shoes or lower limb prostheses and a support surface 38. The support surface can be the floor of the space. In another aspect, the sensor can be a three-axis ground reaction sensor configured to sense: 1) pressure force or vertical force, 2) anterior/posterior shear force, and 3) medio/lateral shear force.

Each sensor 30 can include a housing 42 and an attachment 46 coupled to the housing to attached the housing to the person's ankles, feet, shoes or lower limb prostheses. In addition, the housing or sensor can have a battery port 46 with an opening 50 through the housing and into the battery port. A rechargeable battery 54 can be insertable through the opening 50 and into the battery port 46. Thus, the battery 54 can be removed from the sensor or housing and disposed on a charger. The sensor 30 can include electronics housed in the housing 42. The sensor 30 and/or the electronics can comprise a sensor 58, the battery power source 54, a wireless transceiver 62, a digital memory device 66, and one or more (mobile) processors, which can all be disposed in the housing. In one aspect, the (mobile) processor 70 can be electrically and operatively coupled to the sensor 58, the power source 54, the wireless transceiver 62, and the digital memory device 66. In another aspect, the (mobile) processor 74 can include the wireless transceiver 62 and/or the digital memory device 66 and/or the sensor 58, and can be electrically and operatively coupled to the battery power source 54. The term "sensor" is used broadly herein to refer to both the sensor unit 30 including the housing, etc., and the sensor 58 itself as an electrical component. The one or more mobile processors 70 or 74 can be disposed in the housing 42, and coupled to one of the pair of force sensors 58. The one or more mobile processors can be configured to receive force signals, convert analog signals to digital signals, filter the signals, amplify the signals, condition the signals, compensate the signals and/or calibrate the signals. The wireless transceiver 62 is disposed in the housing, and coupled to the one or more mobile processors 70 or 74. The one or more mobile processors can be configured to produce a time-stamped, left- or right-side identified, seven-axis vector quantity. In addition, the one or more mobile processors and the wireless transceiver can be configured to transmit the vector quantity at 120 Hz or greater in one aspect, or 60 Hz or greater in another aspect.

One previously mentioned method to synchronize the visual and force data from different wireless or wired sensors is an event in the data file itself that creates a spike in both data streams, such as bouncing on the toe with the leg extended fully behind. A second, and more preferred method, is to synchronize the wireless transmitters without the need to create an action on the part of the subject. One method to do this is the TPSN protocol, or a Timing-Sync Protocol for Sensor Networks, consisting of a level discovery phase and a synchronization phase, given that two communications between the levels and nodes are present. With one root node assigned in the network, a time signal can be sent from Node A to Node B in a level discovery phase, but subsequently all nodes can keep track of time, with Node A sending a time-stamped packet to Node B, B to C, C to D, and so on to N nodes to complete the next work. The time-stamped packet of each node's time can then be sent backwards up the chain to double the difference between each one, or create a time-stamped loop which details the lag or clock difference between each node. In this manner, the four main delay times (send time, access time, propagation time, and receive time) are accounted for during the synchronization process.

For full-body, multi-limb segment gait analysis, a 3D vector of the Ground Reaction Force (GRF) can be used for accurate Inverse Dynamics. The force and moment measurement system, in one embodiment, comprises an insole sensor with wireless capability, and at least one body-worn computer able to wirelessly receive information from the sensor. In another embodiment, the sensor can be placed on the outside of a shoe for ease of use, and to enable cleaner signal generation to describe the foot-floor interaction. The force sensor, in a preferred embodiment, can sense plantar pressure force, anterior/posterior shear force, and medio/lateral shear force. As well, the preferred sensor may sense if a torque, or moment, is exerted between the foot and floor in the plane of the ground. As well, the preferred sensor may have sensing at multiple separate locations along its length to enable sensing the complete foot-floor interaction when only a part of the foot is on the floor, such as during normal ambulation at Initial Contact (IC) when only the heel is on the ground, or at Heel Off (HO) when only the toes are on the ground.

The sensor can easily be mounted on left or right human feet independently, and can record and transmit in real time a 3-axis force of ground contact, and a single axis moment of ground contact, to a nearby Windows desktop computer. The Center of Pressure (CoP) of the 3-axis Ground Reaction Force (GRF) can be located within the area of the sensing element to enable high-quality inverse dynamics, either by sensing element, or by row and column number. Vertical force, Anterior-Posterior shear force, and Lateral shear force are all needed when any partial section of the foot is contacting the ground. The sensor can be an integrated unit that senses vertical pressure, shear, and moment, or a dual layer approach that utilizes separate sensing elements or types. Minimizing the instep cross talk of ground force-induced shear to substrate bending shear will be desired.

An insole pressure sensor, such as those from TekScan or others, can be used, but such sensors are capable of creating a force vector of one dimension, reporting only pressure, or a force normal (perpendicular) to the sensing mat. A plurality of pressure sensors can be placed on the forward section of the insole, and a separate plurality of sensors can be placed on the heel portion of the sensing device, such that a single Center of Pressure can be created for the Ground Reaction Force (GRF) no matter what partial section of the foot is loaded when in contact with the ground. Sensors in the heel can sense load at Initial Contact (IC), and sensors under the toes can sense ground loading during Heel Off (HO). The sensor can measure loading from the occurrence of Heel Strike (HS), through the entirety of stance phase, and until the instant of Toe Off (TO).

The pressure sensors may include materials that deflect in some manner, and such deflection can affect the materials' electrical resistance, and thus, cause a change in voltage.

A second layer of sensing, either integrated with the first or separate, that is capable of quantifying the anterior/posterior and medio/lateral shear forces associated with the foot can be used to create a fully accurate 3D ground reaction force vector. A single shear sensor located at the mid-foot can add accuracy to the 3D nature of the ground reaction force. Further, an even more accurate sensor can have shear sensing at the heel and at the forefoot (metatarsal heads), so that shear is accurately quantifiable during loading periods when the foot is not fully on the ground, between heel strike and foot flat (FF), and again between foot flat and toe off (TO). At heel strike, a shear sensor located at the mid-foot would not be loaded, and therefore would not sense shear forces. As well, a mid-foot location for a shear sensor would not be loaded from terminal stance to toe off, as the heel comes off the ground.

The pressure and shear sensors can be connected to the ankle worn electronics via flexible conductors. The sensor electronics may include, at least, an integrated circuit as a main processor, at least one analog-to-digital converter to receive force signals, a removable, rechargeable battery, and a wireless component to enable communication with the computer.

The sensor can include an A to D converter, microprocessor, and storage device in the form of memory. The electronics can provide for filtering of the signal, amplification, and conversion to digital format. The sensor can include various electronic components for signal conditioning, temperature compensation, analog-to-digital conversion, digital-to-analog conversion and a serial communication bus. Additionally, sensor calibration data can be stored in an onboard memory. The memory can be any volatile or non-volatile memory, such as, but not limited to, PROM, EEPROM, Flash, DRAM, eDRAM, and PROM. The memory can hold sensor calibration data.

The kinetic data can be transmitted wirelessly at a minimum of 60 Hz in one aspect, and at a minimum of 120 Hz in another aspect. For an exemplary embodiment involving sensing the left and right feet, each wireless transmitter can send a time-stamped 7-axis vector quantity (identifiable as left or right) to the receiving computer with less than a half-second delay, resulting in a 7×1 vector (t, GRFx, GRFy, GRFx, Mz, CoPr, CoPc) for each foot. The time stamp of the ankle transmitting modules can be synchronized to the kinematic data on the receiving computer at least at 10× the rate of the data transfer. Thus, if the recording was at 100 Hz, or every 0.01 sec, the time stamp synchronization can be done at 1000 Hz, for an accuracy of 1 millisecond. The wireless transmitting system can be any one of a number of well-known short range radio frequency protocols, supported by commercially available hardware developed for the purpose, such as Zigby, Near Field Communication (NFC), Local Wireless Networks, or Bluetooth.

The sensors and electronics can last at least one year, five days per week usage case of three hours a day of walking. In addition, the sensor can only need to be calibrated once every hour without more than a 2% drift in zero values, or maximum range. The use of removable batteries is useful for patient freedom, and uninterrupted workflow. It is intended that the instrumented patient can be quantified for at least an hour without the need to recharge batteries. Removable batteries are a product benefit on the regulatory side, as the mobile user can never be attached to a "mains-connected" charger. The removable batteries can be 3.7 V Li batteries in the 750 mAhr range.

As indicated above, the system 10 and/or computer 26 can have one or more (fixed or base) processors 28 configured to temporally synchronize the kinetic data from the sensors 30 (or 58) and the kinematic data from the video cameras 18 together. Thus, the kinematic and kinetic data can be viewed and analyzed together. In addition, the kinematic and kinetic data can be saved together as a data file. Furthermore, the kinematic and kinetic data can be presented together in one or more reports to quantify and/or qualify a person's gait.

Figure 1:
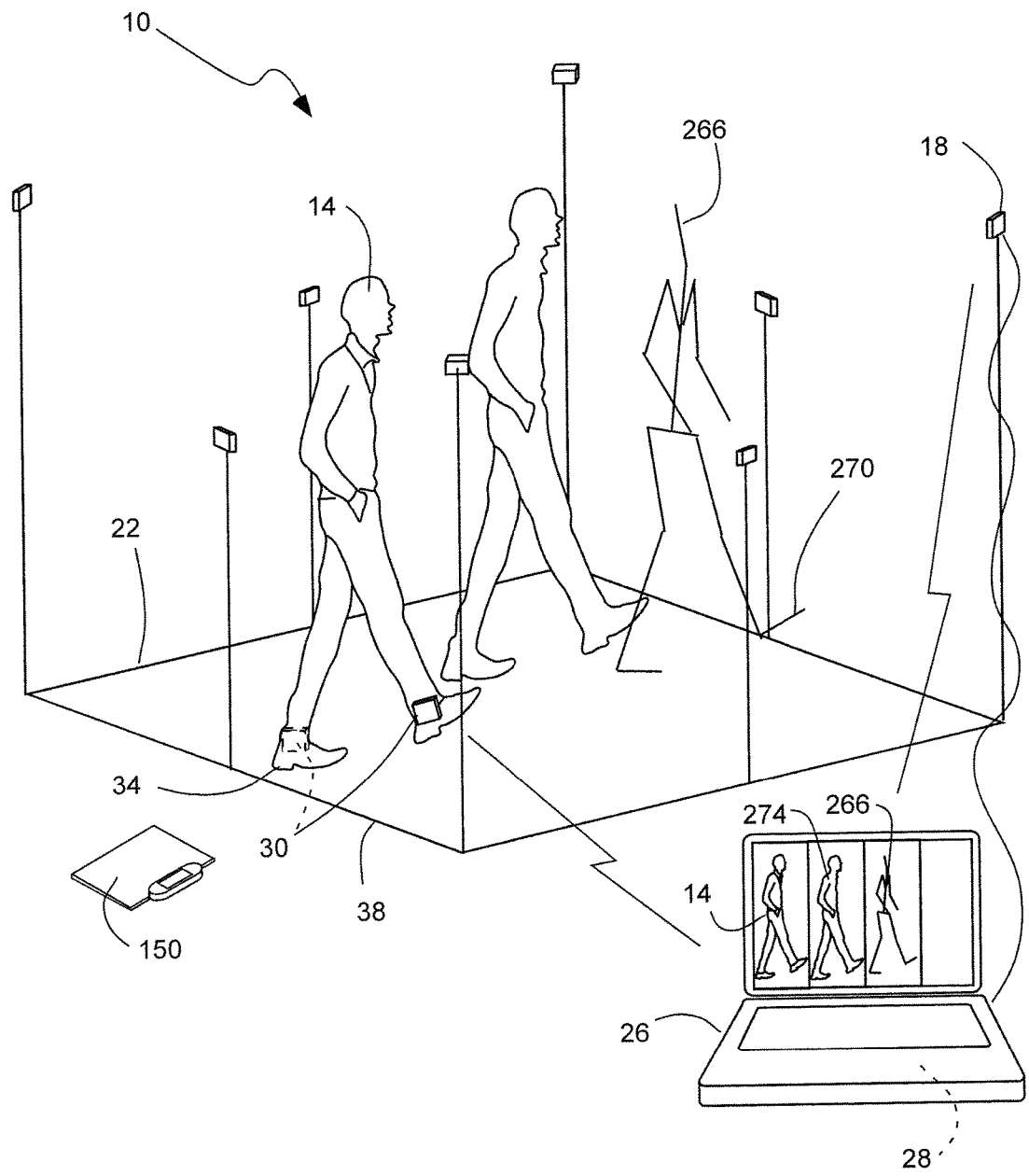
FIG. 1 is a perspective schematic view of a system and a method, and a movement or gait lab, for analyzing movement (e.g. gait) of a person as the person ambulates (e.g. walks) in accordance with an embodiment of the present invention.
Figure 2A:
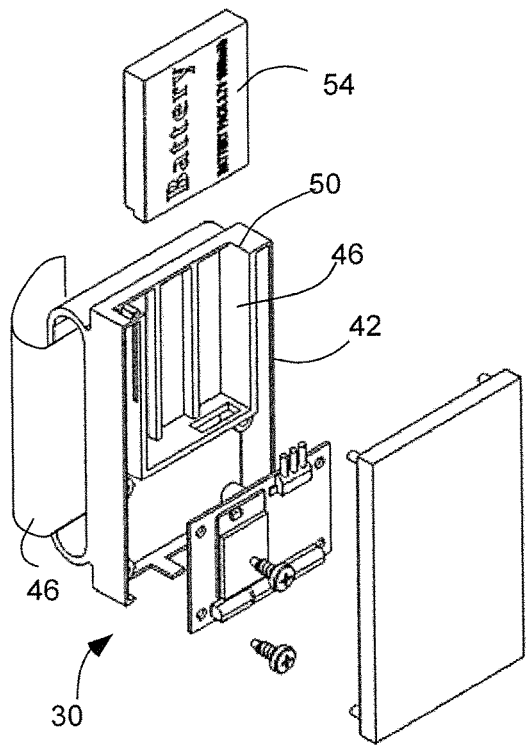
FIGS. 2a and 2b are exploded perspective views of a sensor of the system in FIG. 1.
Figure 2B:
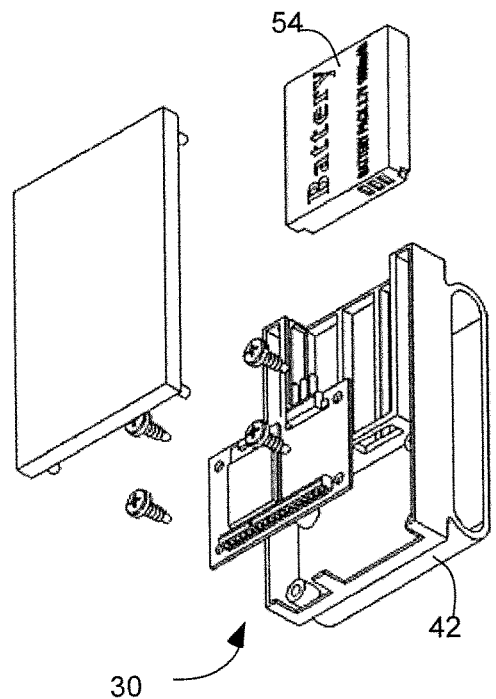
Figure 2C:
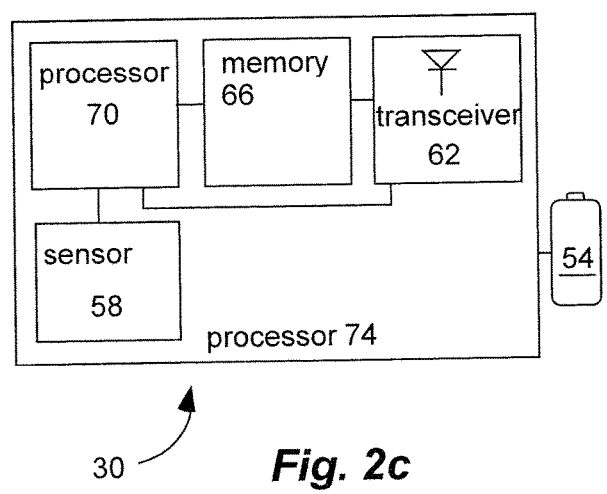
FIG. 2c is a schematic view of the sensor in FIGS. 2a and 2b.
Figure 3:
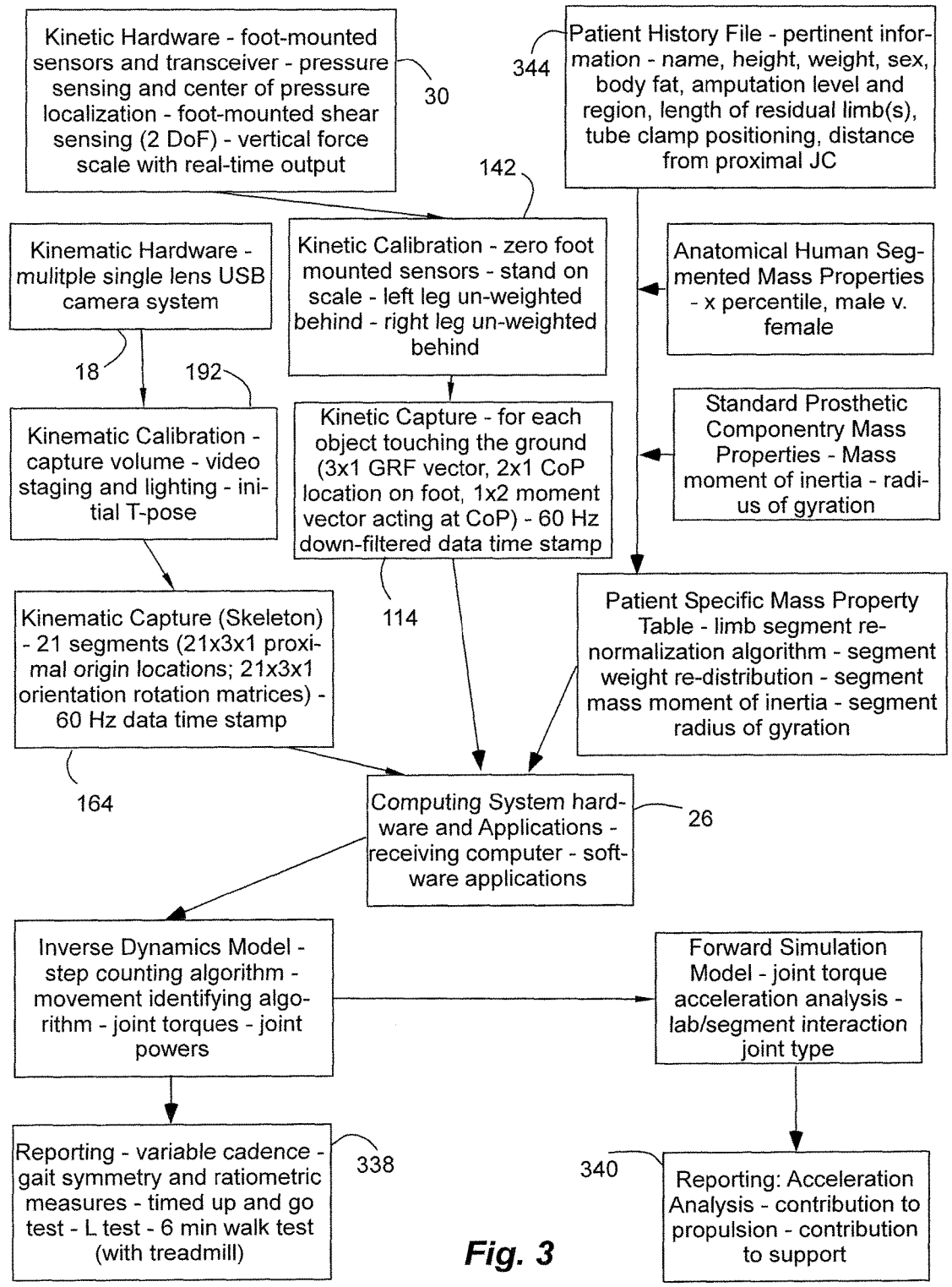
FIG. 3 depicts functionality of the system in FIG. 1 for capturing, synchronizing, and analyzing kinetic and kinematic data.
Figure 4:
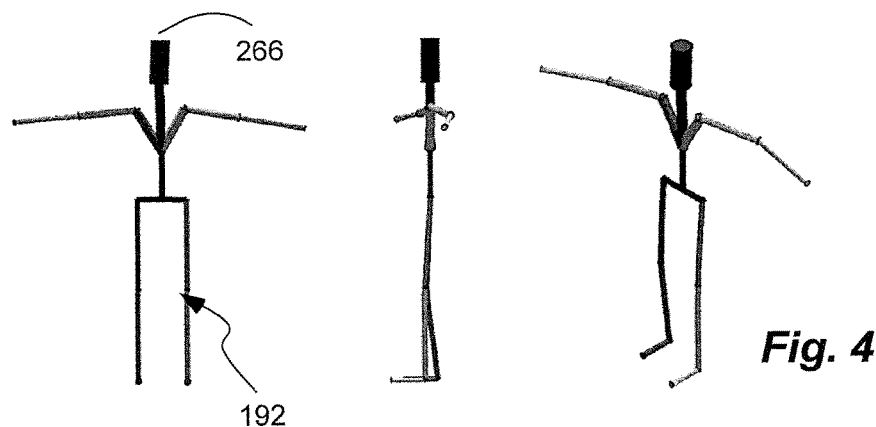
FIG. 4 is a schematic view of a person or subject performing a T-pose initial kinematic calibration, and also shows a rendering of a video recording of the person or subject as a three-dimensional stick figure with a plurality of segments representative of a skeletal model of the person or subject, of the system and method in FIG. 1.
Figure 5:
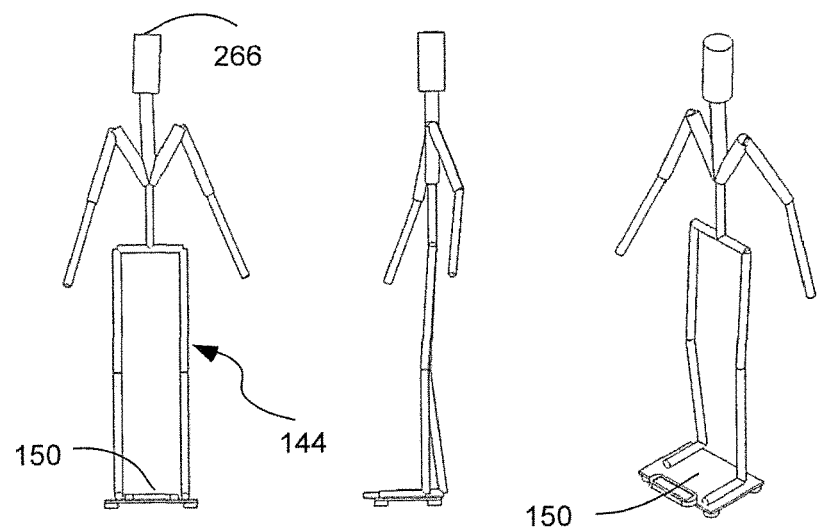
FIG. 5 is a schematic view of the person or subject standing on (connected) scale for initial calibration, and also shows a rendering of a video recording of the person or subject as a three-dimensional stick figure with a plurality of segments representative of a skeletal model of the person or subject, of the system and method in FIG. 1.
Figure 6:
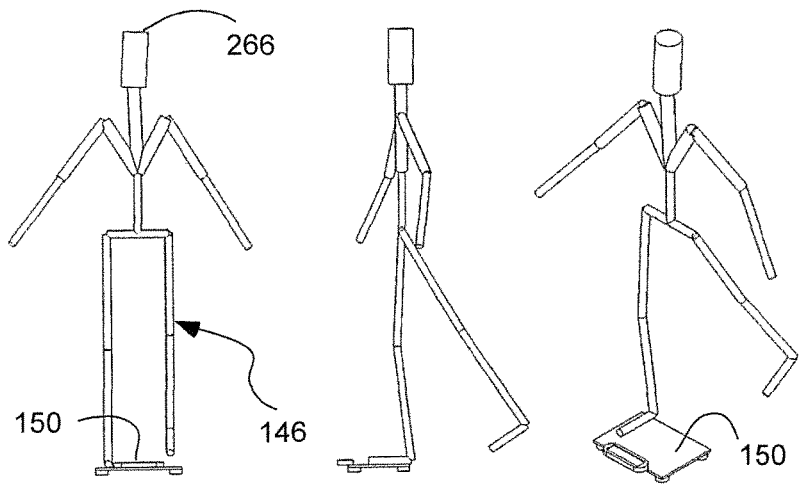
FIG. 6 is a schematic view of the person or subject standing on (connected) scale, with one foot extended behind, for initial calibration, and also shows a rendering of a video recording of the person or subject as a three-dimensional stick figure with a plurality of segments representative of a skeletal model of the person or subject, of the system and method in FIG. 1.
Figure 19:
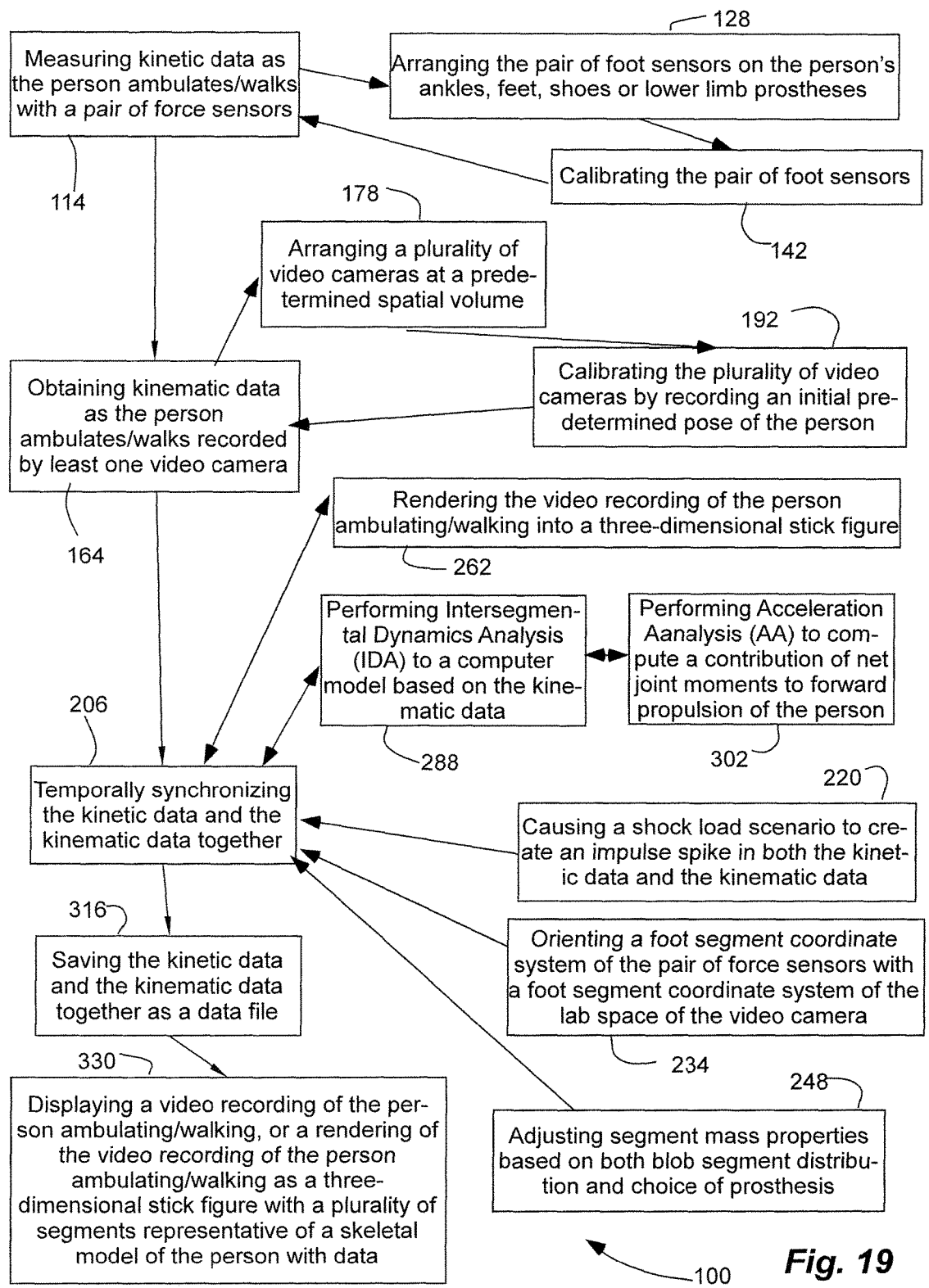
FIG. 19 is a flow chart of a method for analyzing movement (e.g. gait) of a person as the person ambulates (e.g. walks) in accordance with an embodiment of the present invention.

A method 100 (FIG. 19) for analyzing a gait of a person, and for utilizing the system 10 described above, includes measuring 114 3D kinetic data as the person walks with a pair of force sensors 30 or 58 affixed to a person's ankles, feet, shoes or lower limb prostheses 34. Each of the pair of force sensors is affixed to a different one of the person's ankles, feet, shoes or lower limb prostheses. In one aspect, the method can include arranging 128 the pair of foot sensors 30 or 58 on the person's ankles, feet, shoes or lower limb prostheses 34. The pair of foot sensors 30 or 58 can be calibrated 142 by zeroing the pair of foot sensors and having the person stand on a scale 150 one foot at a time in sequence. The scale 150 can be part of the system 10 or gait lab, and can be coupled (wirely or wirelessly) to the computer 26. The initial calibration of the kinetic system can involve standing on a linked scale 150 (as shown in FIGS. 5 and 6), weighing the person or patient, asking for the left foot to be fully extended behind the person or subject, and capturing what the sensors in proximity to the foot and the vertical scale, record at the same time for calibration by the computer.

In addition, the method 100 also includes obtaining 164 3D kinematic data as the person walks with at least one markerless video camera 18 that video records the person walking without markers. In one aspect, the method can include arranging 178 a plurality of video cameras 18 at a predetermined spatial volume 22. The plurality of video cameras 18 can be calibrated 192 by recording an initial predetermined pose of the person, such as a T-pose in FIG. 4.

Furthermore, the method 100 includes temporally synchronizing 206 the kinetic data and the kinematic data together. In one aspect, synchronizing the data can include causing 220 a shock load scenario to create an impulse spike in both the kinetic data and the kinematic data. In one aspect, a method for proper synchronization of kinetic and kinematic data can include a standing calibration test where the person under test undergoes a shock-loading scenario that creates an impulse-like spike in both kinetic and kinematic data. In one aspect, the person can extend a leg behind him or her while quietly standing, and stubbing a toe on the ground to create a synchronization event. In addition, the initial calibration of the kinetic system can involve standing on a linked scale 150, weighing the person or patient, asking for the left foot to be fully extended behind the person, and capturing what the sensors in proximity to the foot and the vertical scale record at the same time for calibration by the computer. Previous knee and hip studies (E. J. Alexander, Gait & Posture, 1997) reported between 11% (knee) and 18% (hip) error in calculated moment with a 1-frame shift of 120 Hz kinetic and kinematic data. Thus, there is a need for proper temporal synchronization between the two data streams. This temporal synchronization can be established either with on-board electronics on the ankle worn devices and the receiving computer, or with actions by the subject within the recording before the investigated activity, such as tapping one toe on the ground while the leg is extended behind.

In addition to temporal synchronization error, another problem is orienting the in-shoe sensed ground reaction force, nominally aligned with the Foot Segment Coordinate System ($FS_{CS}$), to the Global Lab Space Coordinate System ($GLS_{CS}$). In one aspect, as the foot can only produce force when on the ground, the 3D force vector reported by the in-shoe sensing could be aligned with the lab space ($GLS_{CS}$) by assuming that each axis is parallel when force is produced. While that is a good assumption for the majority of the foot flat gait cycle, and the majority of time a GRF could be produced, this ignores the force generation during Initial Contact (IC) and Heel Off (HO). There is force generation during this time when the heel is in contact with the ground, before the foot segment coordinate system is in alignment with the $GLS_{CS}$, which happens at foot flat. Common foot angles at heel strike can range from 10 to 15 deg, resulting in a source of error in the reported GRF if foot ($FS_{CS}$), and lab space ($GLS_{CS}$) alignment is assumed. This transitory response period can be minimal, and forces can be low, so error can be quantified and determined to be acceptable or not. In another aspect, the method 100 can include orienting 234 a foot segment coordinate system of either of the pair of force sensors 30 or 58 and the patient's feet, with a foot segment coordinate system of the lab space of the video cameras 18. In one aspect, orienting the coordinate systems can include aligning a foot space vertical force component vector reported by one of the pair of sensors 30 or 58 with a lab space vertical axis created by the video camera, and potentially error correcting by assuming the force vector and vertical axis are parallel during flat foot while ignoring force generation during initial contact and heel off. In another aspect, orienting the coordinate systems can include rotating a force vector reported by one of the pair of sensors 30 or 58 using Euler Conversion matrices to the lab space coordinate system of the video camera.

In one aspect, the person 14 or patient can be an amputee with a lower limb prosthesis (such as a prosthetic foot, leg, knee, and/or ankle) on one or both legs. Thus, in addition to temporal synchronization error, and orienting coordinate systems, it may be necessary to quickly and accurately adjust segment mass properties based both on visual blob segment distribution, and choice of prosthetic componentry. One such way would be to stand quietly on a single scale 150 while wearing a pressure/vertical force monitoring system or sensors 30 or 58. A separate method would be to manually enter the prosthetic component descriptions to utilize previously stored segment mass properties of known devices. This would enable both calibrating the kinetic sensors 30 and or 58, and realigning the mass distribution tables for accurate representation of the recorded individual. If a standard leg segment would represent 17% of body weight on average, not only does an amputated leg have a lower percentage of total body mass, all other segments have a slightly higher percentage to bring the total to 100%. For example, a 230-pound person would fit a standard anthropomorphic table (Table 1). If that same person became a left-knee disarticulation amputee subsequently weighing 211-pounds and who kept the same limb mass distribution, and was then fitted with a 2.5-pound prosthetic knee and a half-pound prosthetic foot, then that person could have a mass distribution as found in the second table (Table 2).

TABLE 1

Standard Table, 230 lb Subject

| | Left | Right |
|---|---|---|
| Head | | 8.10% |
| Thorax | | 21.60% |
| Abdomen | | 13.90% |
| Pelvis | | 14.20% |
| Thigh | 10.00% | 10.00% |
| Shank (Leg) | 4.65% | 4.65% |
| Foot | 1.45% | 1.45% |
| Upper Arms | 2.80% | 2.80% |
| Lower Arms | 1.60% | 1.60% |
| Hand | 0.60% | 0.60% |
| Total | | 100.00% |

TABLE 2

Standard Table, 211 lb Left Knee DisArtic Amputee, 2.5 lb knee, 0.5 lb foot

| | Left | Right |
|---|---|---|
| Head | | 8.83% |
| Thorax | | 23.55% |
| Abdomen | | 15.15% |
| Pelvis | | 15.48% |
| Thigh | 7.11% | 10.90% |
| Shank (Leg) | 1.19% | 5.07% |
| Foot | 0.24% | 1.58% |
| Upper Arms | 3.05% | 3.05% |
| Lower Arms | 1.74% | 1.74% |
| Hand | 0.65% | 0.65% |
| Total | | 100.00% |

With reference to the tables, it will be realized that not only did the proportions of segment mass change on the limbs that were amputated, but every segment mass changed its proportion of the total when multiple segments were replaced with lighter componentry. Thus, the method can include adjusting 248 segment mass properties based on both visual blob segment distribution and choice of prosthesis. The adjusting can be done by realigning mass distribution between a standard mass distribution of a non-amputee and mass distribution of the amputee with the prosthesis.

As described above, the computer 26 and/or processors 28 thereof, and associated computer programs, can render the 2D video from the video cameras 18 as 3D stick figures. The method 100 can further include rendering 262 the video recording of the person walking into a three-dimensional stick figure (represented at 266) with a plurality of segments 270 representative of a skeletal model (represented at 266) of the person. As described above, the three-dimensional stick figure 266 can be rendered by: 1) taking a background image of each viewpoint, recording a multiple vantage video section with a subject 14 starting in a known orientation, matching the subject movement to an animated model by subtracting the background at each frame, and matching the model to the 2D image, from each viewpoint. The work flow typically follows such a progression: video of empty capture volume 22, subject movement video (represented at 14), lumped massed (visual hulls) (represented at 274), and multi-segment 3D virtual model/skeleton stick figure (represented at 266).

The method can further include analyzing the kinetic data and the kinematic data, and performing a common Inverse Dynamics Analysis to yield the force and torque in each joint segment during the recording. The method 100 can include performing 288 Intersegmental Dynamics Analysis (IDA) to a computer model based on the kinematic, the kinetic and segment data by applying joint moments to determine subsequent acceleration of the computer model. In addition, the method 100 can include performing 302 Acceleration Analysis (AA) to compute a contribution of net joint moments to forward propulsion of the person. In addition, the method 100 can include performing 302 Acceleration Analysis (AA) to compute a contribution of net joint moments to vertical support of the person.

Inverse Dynamics (ID) can be more accurate when starting at the force plate and working up, not starting at the edges of the kinematic chain and working down. The aim of biomechanical analysis can be to know what the muscles are doing: the timing of their contractions, the amount of force generated (or moment of force about a joint), and the power of the contraction—whether it is concentric or eccentric. These quantities can be derived from the kinematics using the laws of physics, specifically the Newton-Euler equations:

Newton (linear): $F=ma$ (Force=mass×linear acceleration)

Euler (angular): $M=Ia$ (Moment=mass moment of inertia×angular acceleration)

These equations describe the behavior of a mathematical model of the limb called a link-segment model, and the process used to derive the joint moments at each joint is known as Inverse Dynamics, so-called because we work back from the kinematics to derive the kinetics responsible for the motion (as shown in FIG. 20). The motion can be open-chain, with no resistance to motion at the terminal segment, since all the kinematic variables are known from motion analysis (in this case Rxd and Ryd of the first segment in the chain, the foot, are both zero). When there is contact of the limb with another object, such as the ground, or a cycle pedal, the forces between the limb and the obstructing object in this closed-chain can be measured. The technique of strain-gauging can be used, such as used in a common force platform to measure the ground reaction force during walking and running.

In looking at the human biomechanics, the effect of a joint moment through the kinetic chain cannot be determined simply from looking at a time history of joint moments. Conventional biomechanics, and specifically Inverse Dynamics, can indicate what total force and moment is generated at each joint, but cannot quantify the relationship between those loads and their effect on motion. The current limitation of Inverse Dynamics data, as calculated by gait labs, is the production of net, or summed, joint moments and reaction forces for each segment. These net outputs are the result of a sum of all active inputs, many of which cancel out in summation. This summation does not impart a full picture of what the neuromuscular control systems of the body are coordinating. To quantify this coupling among all movement generators in the model, meaning 3D moments at each joint, requires new and sophisticated analysis methodologies.

In order to understand what the neuro-muscular system must administer, instead of the summed result of activation commands, it is essential to quantify how each joint torque will accelerate all segments in the connected kinetic chain. This perspective can be clarified by using Intersegmental Dynamics Analysis (IDA), where joint forces and torques are applied and subsequent accelerations are calculated. The insight gained from performing acceleration analysis, and the reason it is worth the difficulty, is the comprehensive view of the multiple effectors that contribute to the motion of any one joint.

In one aspect, the system and method can objectively quantify how the leg muscles contribute to motion and how those strategies may differ when weakness or amputation is present. The strategies used to compensate for muscle weakness and optimize movement patterns cannot be objectively and accurately determined using conventional biomechanical analyses. Motion capture data are often used to assess these strategies, but lack correlation between recorded joint torques and motion they produce. An analyst must speculate on this relationship based on anatomic classification of muscles—which is known to be inaccurate. For example, the gastrocnemius attaches to the back of the knee joint but has been shown to cause knee extension in some cases. Acceleration Analysis can be used to provide a map of the effect of torque-spanning multiple joints during any activities for which a complete data set is captured.

To perform Intersegmental Dynamics Analysis, joint moments from a gait lab trial were then applied separately to a computer model which could determine the subsequent accelerations of the model that was posed based on the kinematic data. Each load produces a unique acceleration on every segment, for every time frame. The acceleration of every segment in the model due to an individual load is hereafter termed the component acceleration (CA) due to that load. The sum of all component accelerations should be equal to the observed acceleration of the body as seen in the gait lab.

Points of interaction with the environment, such as where the feet touch the ground, are replaced with joints. Such replacement is necessary to account for the interaction between the body and the environment. Both feet (and all other segments subsequently) are constrained in a manner consistent with actual segment acceleration during the patient's motion. A force is created at this joint by model acceleration, and this component ground reaction force is an important check on model validity.

Amputees are also capable of adapting to a large variety of geometric configurations and alignments of prosthetic components. There are many choices in prosthetic componentry, but few scientifically-based guidelines for their prescription. Optimal prosthetic alignment depends heavily on clinical judgment. Consequently, considerable variability and sub-optimality exists in amputee functional outcomes. Despite a wide prosthetic knowledge base (research publications, manuals and textbooks) there is scant information on the relationship between prosthetic alignment and amputee function.

Muscle forces acting at a joint accelerate all other segments in the body. Acceleration Analysis (AA) can quantify how much acceleration is produced by each muscle group at any joint in the body. Power redistribution between segments and muscles play a major role in body support and progression, and the precise quantification of the contribution of individual muscles to support and progression resolve many conflicting explanations of how gait occurs. Similarly, AA can help to objectively quantify compensatory mechanisms in amputee gait and in doing so, elucidate the alignment-function relationship.

Acceleration Analysis (AA) can be used to compute the contribution of net joint moments to forward propulsion. This is defined by how all individual joint moments work to accelerate the Center of Mass of the subject in translation in Global Lab Space. Vertical accelerations are defined to be those contributing to support, or resisting the gravity vector.

Horizontal Accelerations are those that contribute to propulsion, either moving the body forward, or braking to slow the body down.

The method 100 can include saving 316 the kinetic data and the kinematic data together as a data file. In addition, the analysis performed on the kinetic and/or kinematic data can be saved together with the data. Furthermore, the method 100 can include displaying 330 a video recording of the person walking, and/or a rendering of the video recording of the person walking as a three-dimensional stick figure with a plurality of segments representative of a skeletal model of the person, along with data. The data can include the analysis from the IDA and/or AA overlaid with the video or rendering. The data can include the kinetic data measured by either of the sensors 30 or 58 overlaid with the video or rendering. Furthermore, the method 100 can include reporting (indicated at 338 and 340 in FIG. 3) analysis of the kinetic data and the kinematic data. In one aspect, the reporting can include displaying 330 the data and the video or rendering overlaid one another. The method can include having the person 14 perform various specified movements corresponding to standard tests, and then reporting the data and/or analysis derived from those specified movements. In one aspect, the reporting and/or displaying can include the variable cadence metric. The variable cadence metric can be used to justify a person being worthy of advanced prosthetic componentry. Simple level ground walking is the motion needed to capture to enable reporting on speed of cadence.

A sit to stand motion can be used to test subject capability, and can be expanded into a test that involves standing from a seated position, and walking several paces, referred to as the Timed Up and Go (TUG) Test. Alternatively, an "L Test" involves multiple turns both to the left and to the right, and two transfers. The L Test starts with a seated subject, asks that they stand, walk two meters forward, turn 90 degrees to the left, walk three meters forward, turn 180 degrees, walk back the three meters just traversed, turn 90 degrees to the right, walk the two meters back to the chair, turn 180 degrees, and sit down. During this test, in order to capture all data the subject exerts on the environment, the scale that was previously used during initial calibration could be placed on the seat to capture the weight exerted while seated. This third data stream also provides data to quantify the timing of the event of "seat-off", and can also be used to align the time stamp on the kinetic and kinematic data.

Figure 7A:
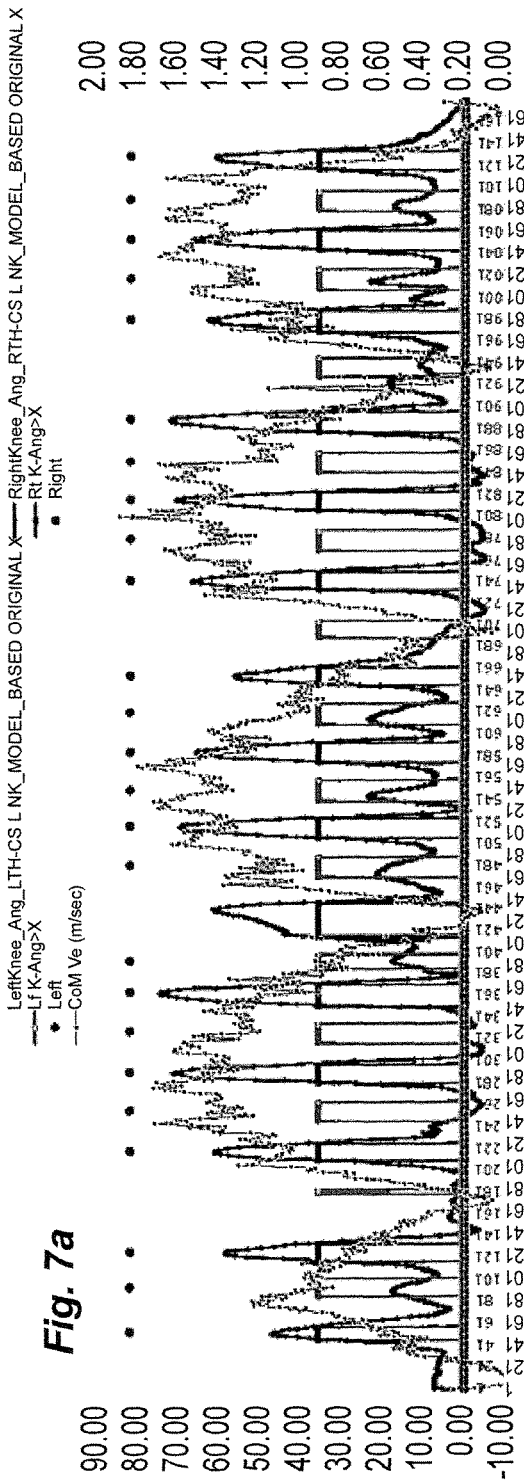
Figure 7B:
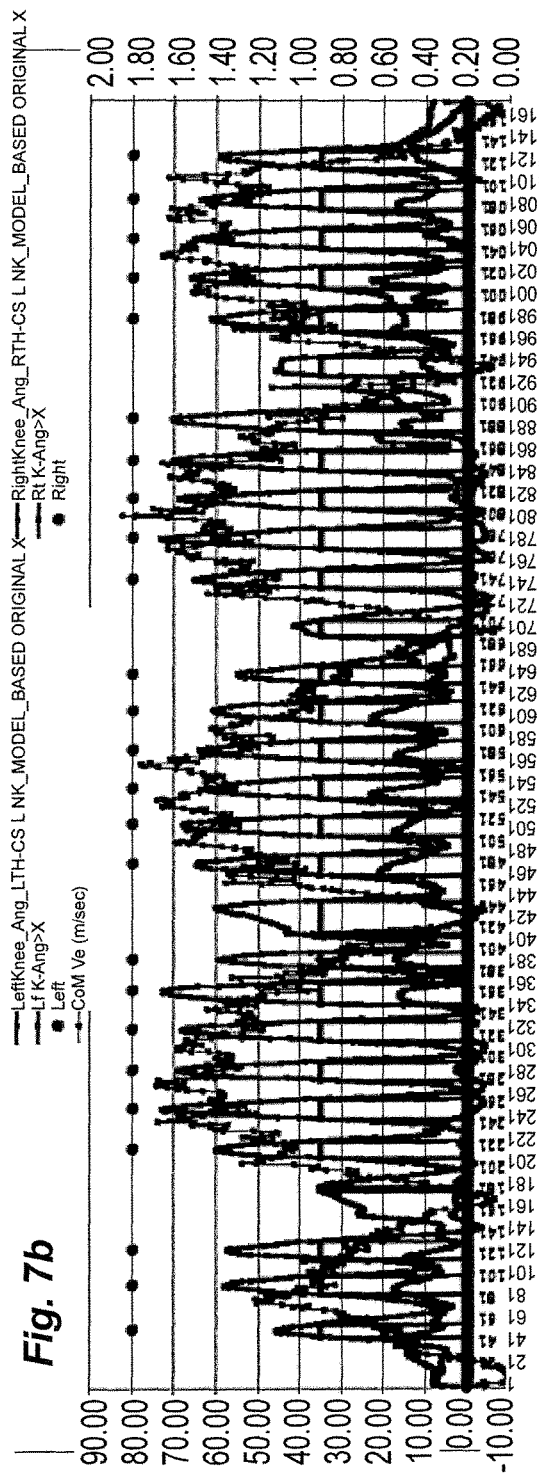

An example of a variable cadence report and/or analysis for an exemplary patient is shown in FIGS. 7a-14. A level-ground walking, variable cadence determination can be performed with the patient recorded walking at three different speeds; and a comprehensive kinematic and kinetic data set is generated. To create a step counting algorithm which knows the time and location of each foot strike, several different data streams can be used. There are many different factors that could individually indicate that a person was taking a step, and taken together in a neural-network type of voting algorithm, a very robust determination of foot strikes can be made with high accuracy. For example, the following conditions can be analyzed to determine if a person was in mid-stride in single leg support in the middle of a step: Is there weight on the foot nearer the ground? Is the other foot off the ground? Is the contra-lateral side showing knee flexion above a certain threshold? Is the contra-lateral side showing knee angular velocity above a certain threshold? Is the body's center of mass showing horizontal velocity? For these measures, a map can be generated of a single walk which automatically calculates the frame number of the event, which means the time stamp of that frame is then known. Once there is a known time stamp for every event, the temporal and spatial difference to the prior event can be known. For example, the graphs in FIGS. 7a and 7b illustrate looking at the selected data streams for the body CoM Velocity, and both sides of Knee Angle, Knee Angular Velocity, and Weighted Foot.

For example, a sample report could contain an evaluation of the most common metric for amputee care, the ability to vary cadence. Ability to vary cadence is the leading determination for the level of care and devices that an amputee could be eligible for, and separates the amputee population into K0 through K4 levels. Cadence as a term, however, has not been well defined by the industry. One common quantification of cadence is the ability to vary the numbers of steps taken per minute, such as saying a person can walk on level ground between 66 steps per minute and 111 steps minute. In this case, the measured quantity has units of steps per minute (steps/min). Another way to look at varying cadence is to look at the change in the length of one stride to the next, or one step to the next. In this case, a physiatrist might want to quantify that a patient can take short steps in confined spaces, such as a kitchen, and also be able to cover ground while walking the mall. The units on this measure would be the variation on length of a step, or meters per step (meters/step). The last measure that can be determined as cadence is the ability to vary the amount of ground covered in a given amount of time, also known as walking speed. For this example, a physical therapist might want to know if the person can walk a comfortable self-selected speed, but also cross an intersection when a pedestrian light has changed. The units on this measure would be length per time, or meters/min.

Figure 8:
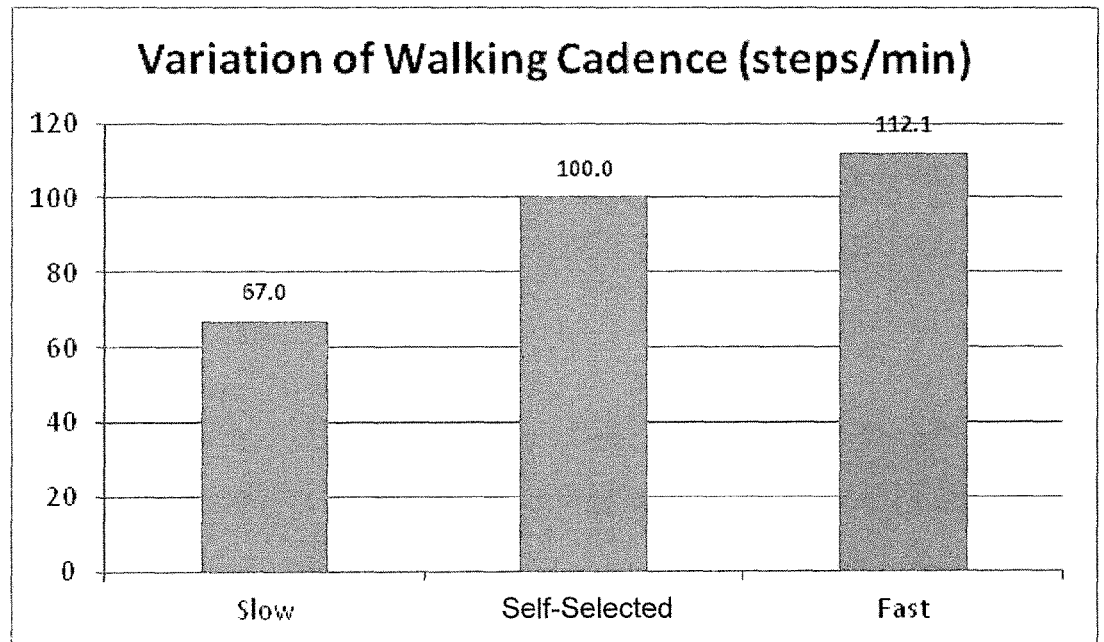
Figure 9:
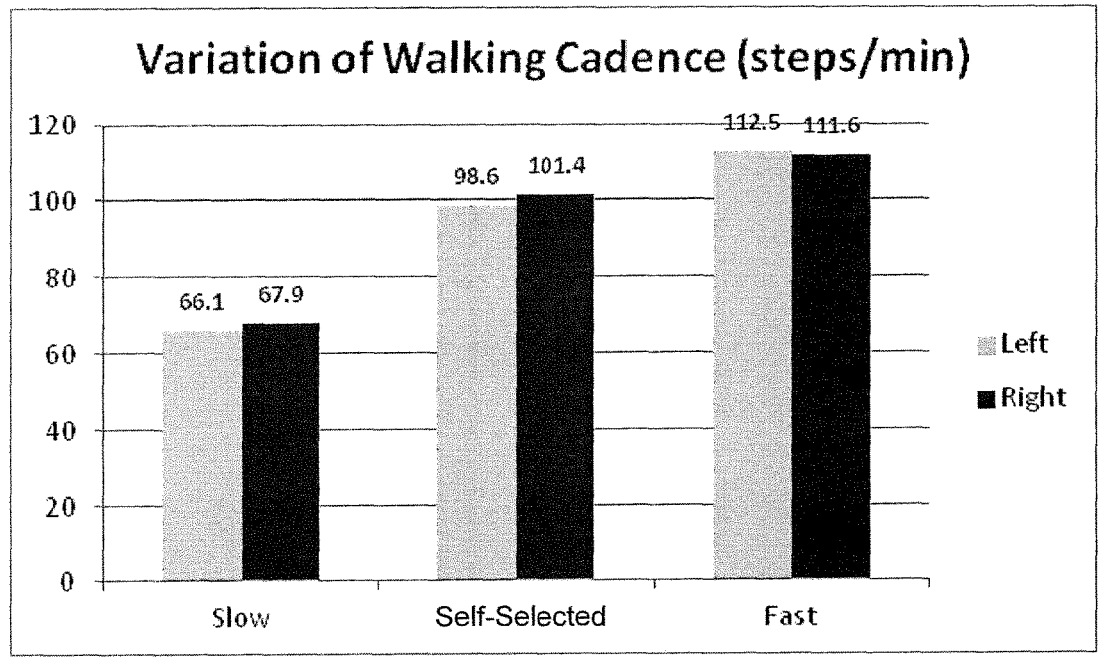
Figure 10:
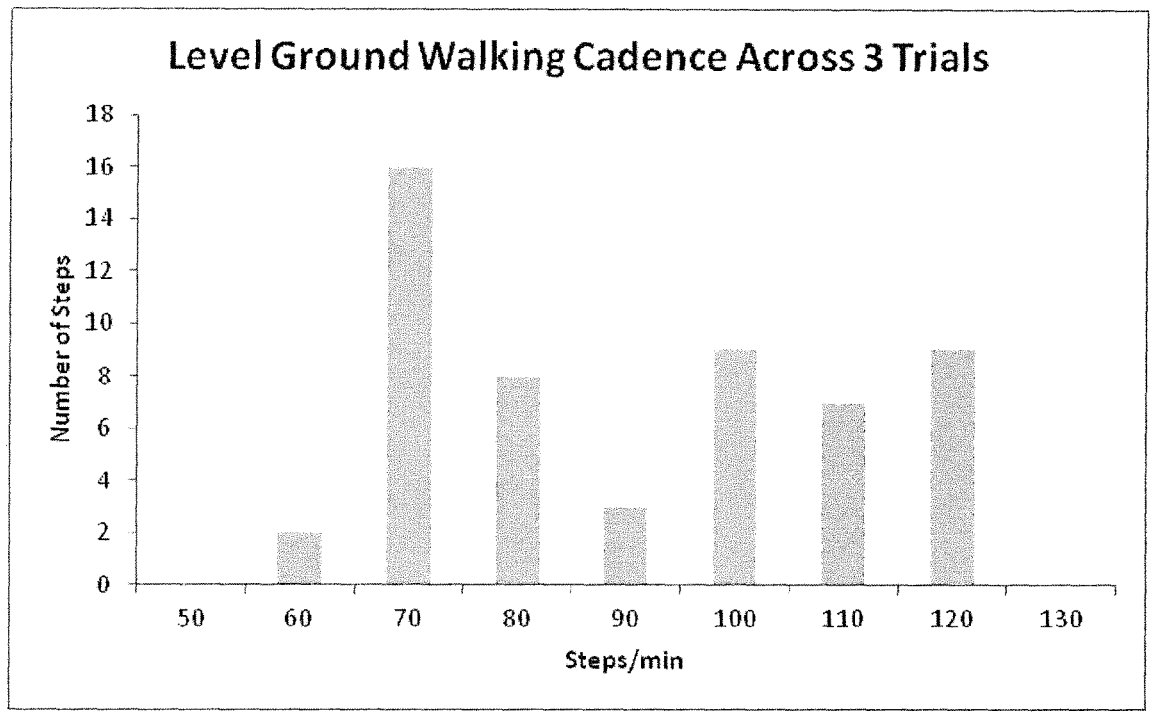
Figure 11:
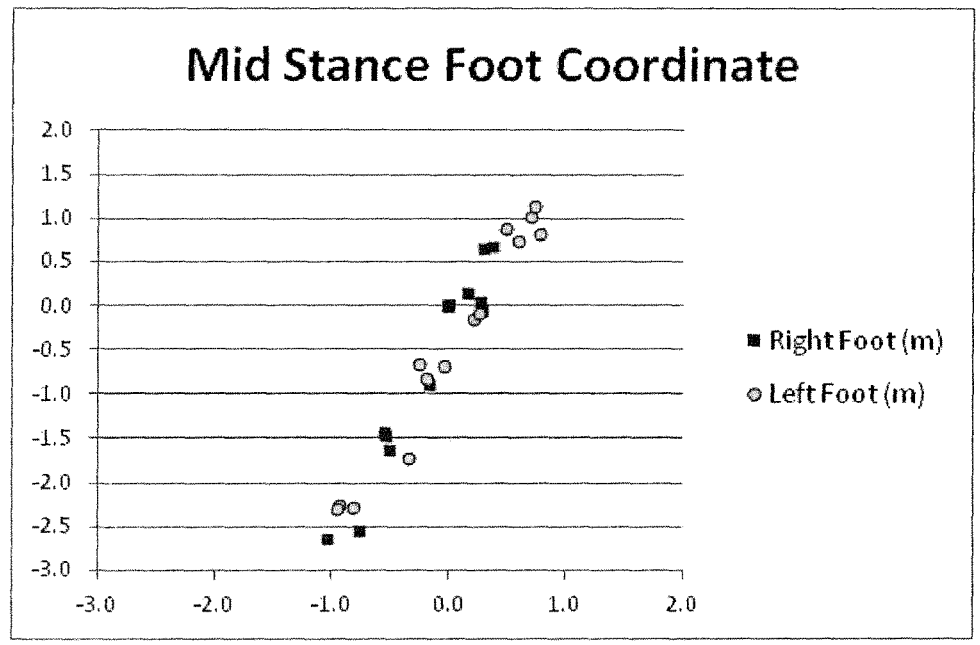
Figure 12:
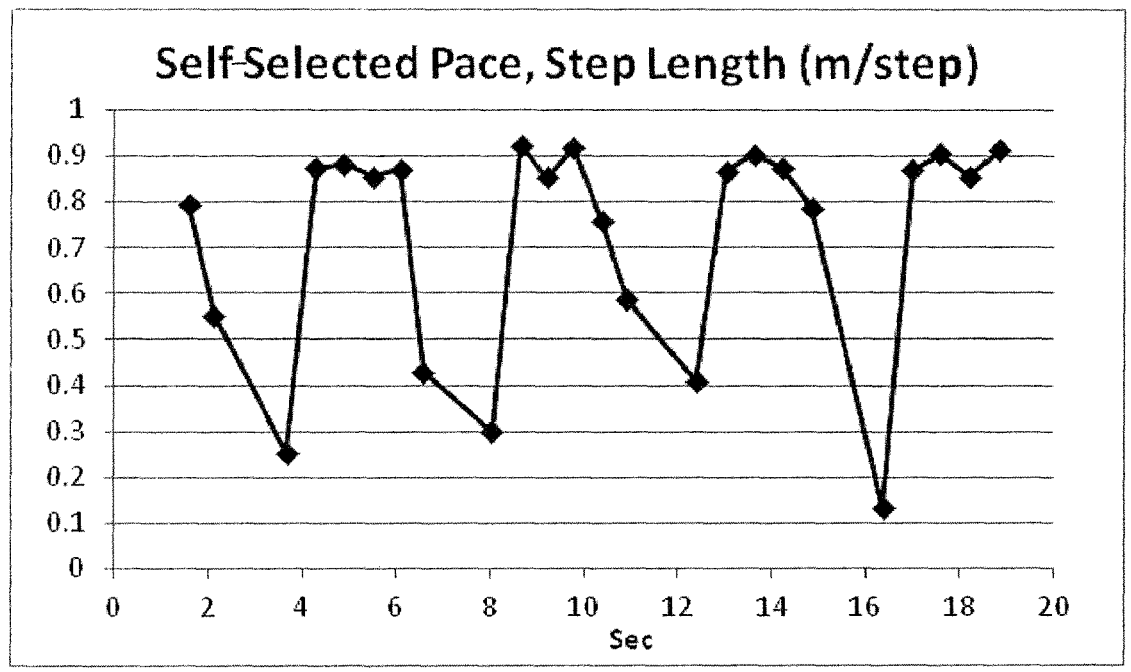
Figure 13:
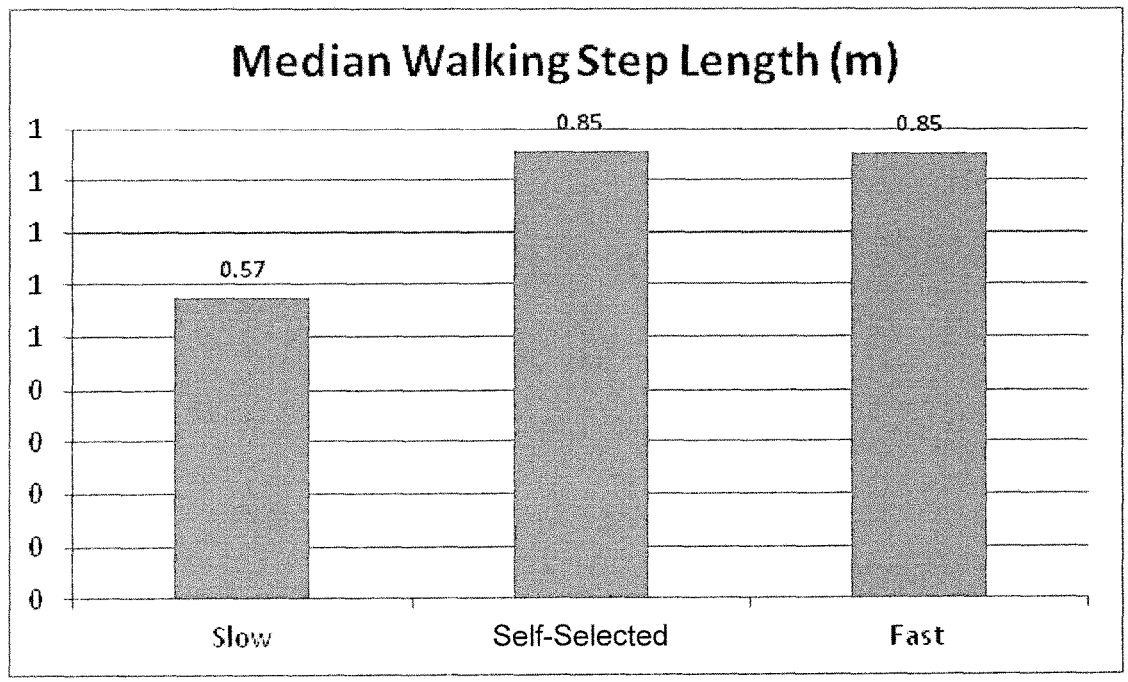
Figure 14:
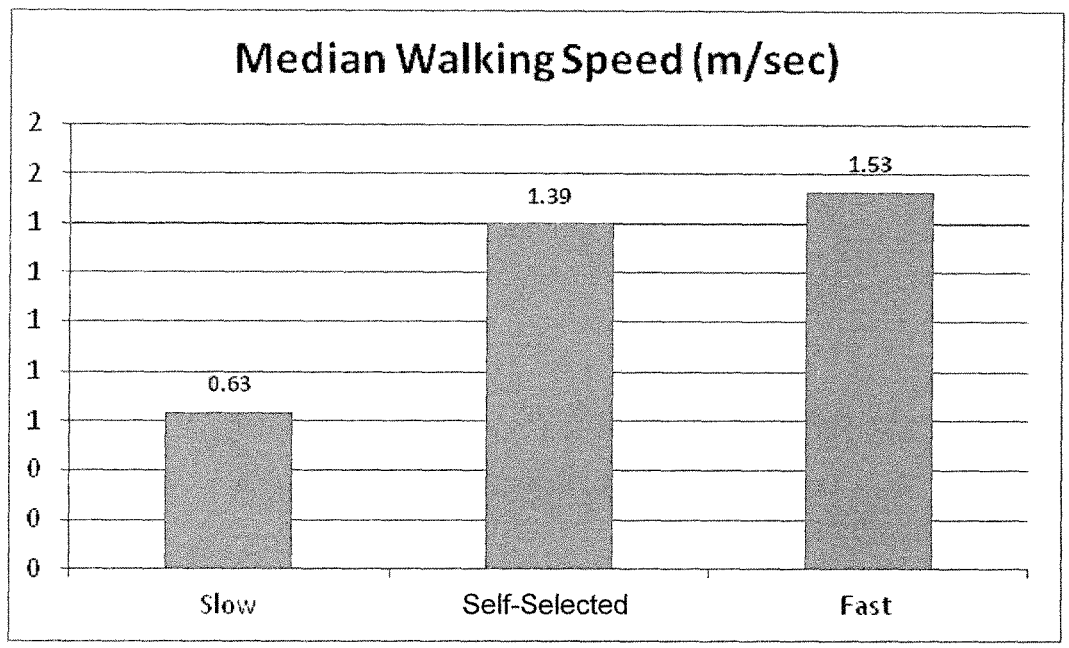

As cadence is defined to be different measures for different medical professionals, the system can generate a report to display many different information sets. For example, the system and method of the present invention can produce a graph as shown in FIG. 8 showing variation of walking cadence in steps per minute as the patient walks on level ground for slow, fast and self-selected speeds. One set of data can show variation of walking cadence, and because both limbs are measured, the left and right symmetry can be displayed, as shown in the graph of FIG. 9. The common reporting of walking at three different speeds is an artifact of antiquated measures where a stopwatch and paper recorded the number of steps and time it took a person to walk at a single speed. With the present system and method, a person can walk at a continuously varying speed, and a histogram can be created which also details the ability to vary cadence measured by steps per minute. For example, the system and method of the present invention can produce a graph as shown in FIG. 10 showing level-ground walking cadence (across three trials). For the same data set, once the time stamp of a foot strike is known, the location of each foot at that time can be graphed to denote where the person walked in the calibrated volume, as shown in the graph of FIG. 11. With this information, the length of each step from left foot mid-stance to right foot mid-stance can be determined, and graphed to show the step lengths for the given trial, as shown in the graph of FIG. 12. With this data complete, the system can also display the median (or average) walking speed of the steps the subject took, as shown in the graph of FIG. 13. The last type of data to display is the change in the ability to cover ground as the person varies cadence, this time looking from the perspective of meters per second of locomotion, as shown in the graph of FIG. 14.

Figure 15:
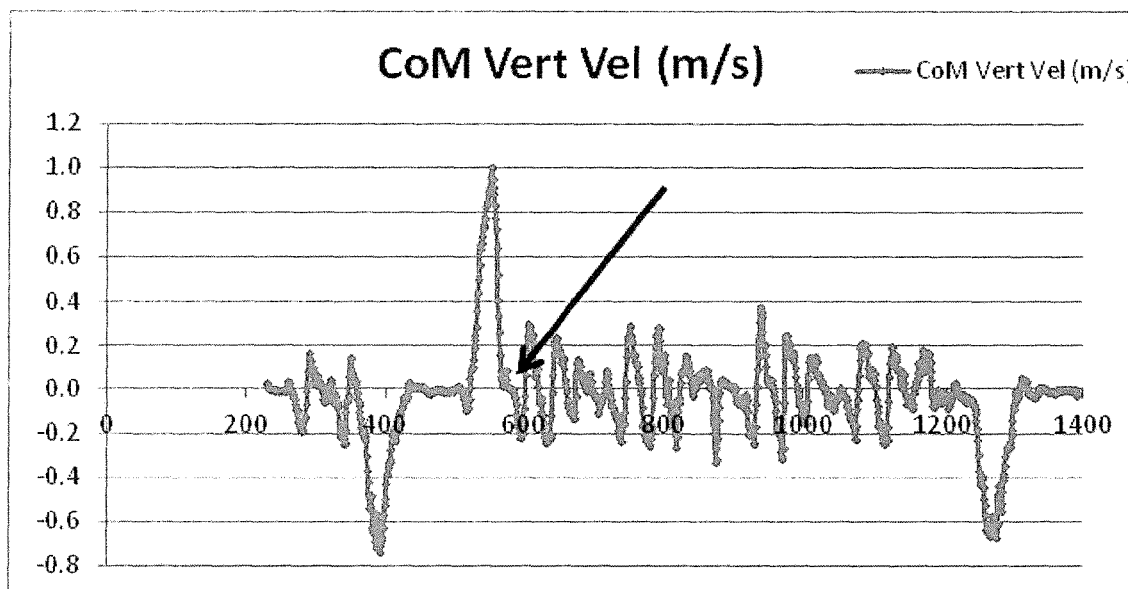
FIGS. 15-18 are graphs of an exemplary report produced for an exemplary patient.
Figure 16:
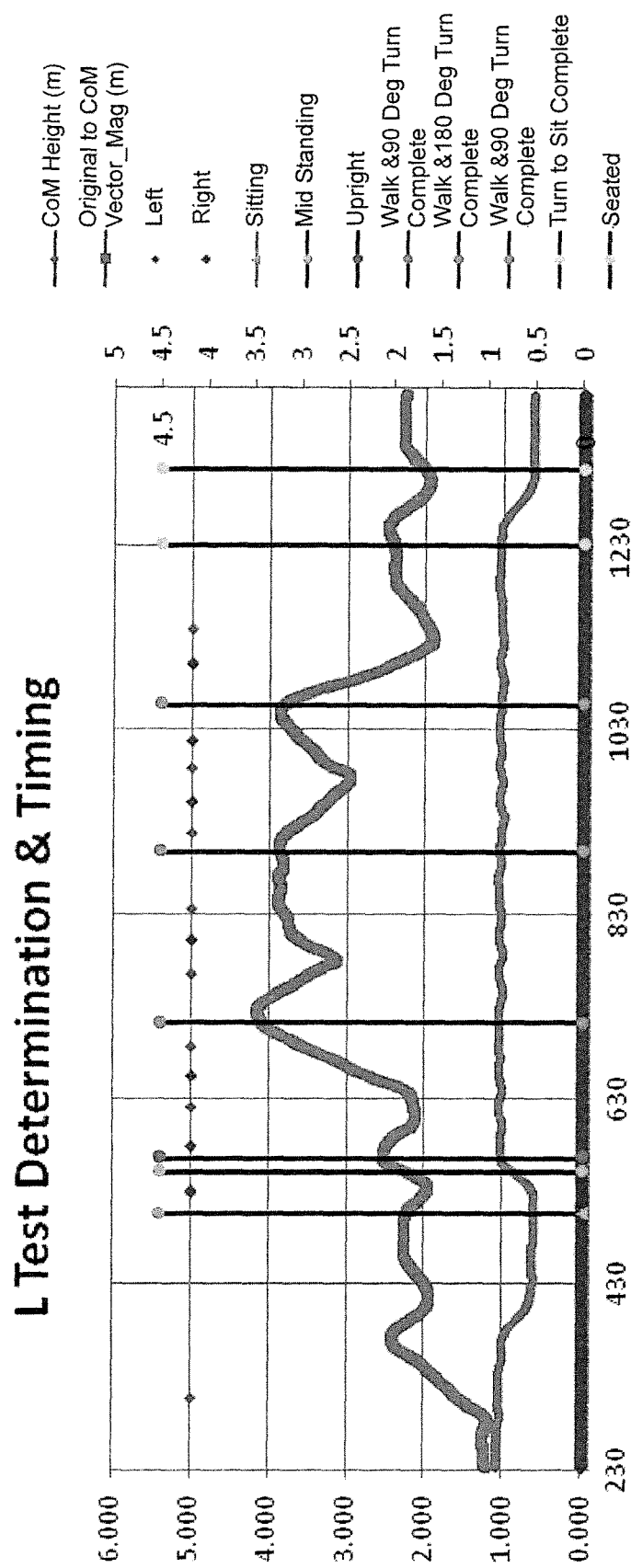
Figure 17:
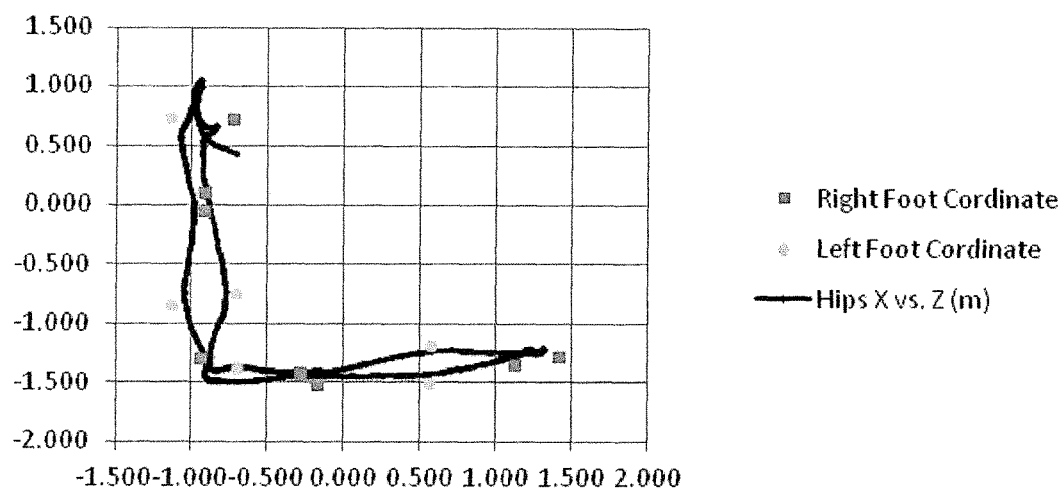
Figure 18:
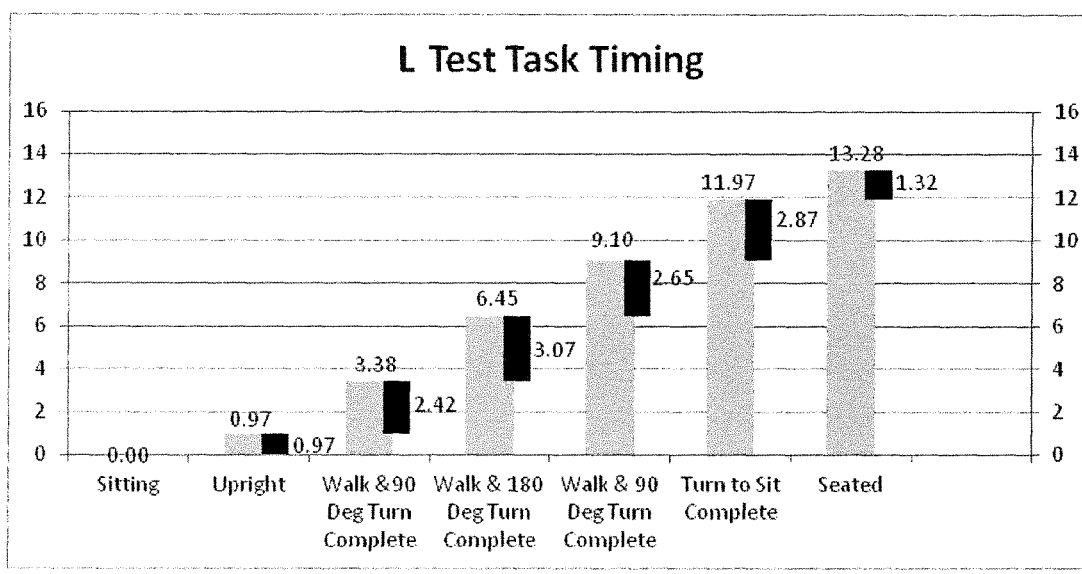

An example of L Test data reduction and reporting for an exemplary patient is shown in FIGS. 15-18. The L Test is a measure of multiple different activities all combined into one test that can assess a person's capabilities for ambulation and transfers needed for independent living. This variation on a Timed Up and Go test (TUG Test) adds four separate walking motions in an "L" shape, each of two meters. For this reason, it can be abbreviated as the TUG+ 2m^4 Test. The previously disclosed methodology can be used to identify periods of single leg stance, and thus determine where and when a heel strike, or a step occurred. It can be important to separate the L Test into the time needed for each component to be completed. For instance, the time stamp of standing can be determined from inspection of the vertical velocity of the center of mass, and selecting the first zero crossing after the first global max, denoting that rising has happened, but now steady state height has been achieved, as shown in FIG. 15. Other factors can be probed and evaluated to separate the data stream into different sections that can be given an individual time stamp, as shown in FIG. 16. One way to represent the L Test outcome is a simple time table waterfall chart, which shows the total time to complete the entire test, and the individual time that a subject used to complete each component, as shown in FIG. 18.

Detectable events can be seen on the 2D video feed, and displayed in isolation to the subject and practitioner after being identified by algorithm from the 3D skeleton data. 3D composite data can be played back with the skeleton model overlaid to show both the practitioner and the subject the significance of patterns found in the recorded gait. One such gait deviation that could be useful to coach an amputee subject is shoulder drop, common when the prosthetic limb length is too short and needs to be adjusted. Other such events that are discernible with software applications are Hip Hiking (common when a prosthesis is too long and the amputee rotates the pelvis in the frontal plane to gain ground clearance for the foot), crushing the heel (common when a prosthetic foot is too soft for a person who feels like he or she is stepping into a hole with each IC [Initial Contact]).

The reporting and saving can allow for reporting for auditing/payment measures. The system and method allows a patient report to be generated easily and quickly with many different outcome measures. Typical gait reporting for both sides could be seconds per step left and right as a bilateral column chart at fast, medium and slow walk, which would instantly show stride time/length symmetry. The system and method can report quantified measures of activities of daily living, capability of variable cadence, verification of beneficiary receipt, etc. For example, the Medicare proof of delivery must be a signed and dated delivery slip which includes: beneficiary's name, delivery address, sufficiently detailed description to identify the item(s) being delivered, quantity delivered, date delivered, the date of delivery as entered by the beneficiary, designee or the supplier, and the beneficiary (or designee) signature.

Furthermore, the method 100 can also include creating a patient history file comprising patient information (indicated at 344 in FIG. 3) including patient height, patient weight, patient mass distribution and patient body fat. The patient information can be saved together with the data file of the kinetic data and the kinematic data. In addition, the patient information can be used in the analysis, for instance, to adjust the segment mass properties.

The system and method provide several improvements of current available methodologies which are immediately apparent. One improvement is the ease of set up for the system, which enables capture techniques of a modern gait lab without the requirement of placing markers on the subject in anatomically relevant positions, or the training needed to do so. Another improvement is that the subject motion is unconstrained, such as with solutions in modern gait labs that mount force sensing plates in the floor, but demand that the subject walk precisely over those parts of the lab. Force plate systems inherently constrain the motion of the subject, and thus limit the activities that can be studied. Another improvement is that all the components of the system stay within the offices of the investigator, without the need to send parts home to monitor a subject, which raises subject compliance issues, identification of the person vs. the collected data to prevent fraud, or the possibility of lost or broken componentry when used outside of a standard and controllable environment when the complete system stays within the clinic. Parts are not lost or missing when it comes time to conduct a trial or measure the next patient.

In one aspect, the system or movement/gait lab can be provided as a kit with the video cameras and sensors together. In another aspect, the computer and scale can be provided as well. The various components (video cameras, sensors, computer and/or scale) can be provided together in a case to facilitate transportation/mobility, and protect the components during transport. The case can be provided with a handle, an extendable handle, and/or wheels to facilitate transport. In another aspect, one or more battery chargers can be provided. In another aspect, a template can be provided that can be disposed on the floor, or marked on the floor, to define the spatial volume and/or outline a path corresponding to various tests.

The computer and associated programs and/or applications can be operated by the practitioner, who then interacts with the subject. The computer applications can receive inputs, such as physical parameters specific to the subject, receive information via the sensors 30 or 58 worn by the subject, and use that information to calculate and quantify the actions of the subject for a particular physical activity. The patient information can include the forces collected with the sensors, and the physical position of the body and limb segments during activity. Such a computer can comprise at least one USB 3.0 data card for every two cameras, and may comprise at least one active USB extension cable per camera. The system can include one or more computers 26. While shown as a single stand-alone computer, the computer can be more than one computer, distributed locally or remotely to one another. The computer can store algorithms for performing comparisons of the information collected from the patient to model information. The applications running the one or more computers may be described in the context of computer-executable instructions, such as program modules being executed by the host computer. Generally described, program modules can include routines, programs, applications, objects, components, data structures, and the like that perform tasks or implement particular abstract data types.

The applications can be stored on the computer 26 or in a remote server to which the computer is communicatively linked to, such as through the Internet. In one embodiment, for example, one computer may be local or a remote server. Furthermore, the functions performed by the computer may be distributed or shared among more than one computers that are all communicatively linked, such as via local area networks (LAN), wide area networks (WAN), and/or the Internet. Any communication over the Internet or other network may be encrypted for security.

The computer may be any one of a variety of devices including, but not limited to, personal computing devices, server-based computing devices, mini- and mainframe computers, laptops, or other electronic devices having some type of memory. More than one computer can be used in place of a single computer. The computer 26 can include a processor, a memory, a computer-readable medium drive (e.g., disk drive, a hard drive, CD-ROM/DVD-ROM, etc.), that are all communicatively connected to each other by a communication bus. The memory can comprises Random Access Memory ("RAM"), Read-Only Memory ("ROM"), flash memory, and the like. The host computer can include a display and one or more user input devices, such as a mouse, keyboard, etc.

The memory can store program code that provides a gait analysis application and a step detection application. The gait analysis application can include computer-executable instructions that, when executed by the processor, applies an algorithm to receive, display, and process input, including moment and force data. The step and phase detection application can apply an algorithm to a set of moment and axial force data to differentiate each step. Further, the step and phase detection application can establish if the subject is either in stance or swing phase of a gait cycle.

The computer application can enable all the quantification reporting herein.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for analyzing movement of a person, the method comprising:
    a) measuring 3D kinetic data as the person ambulates with a pair of force sensors affixed to a person's ankles, feet, shoes or lower limb prostheses with each of the pair of force sensors on a different one of the person's ankle, feet, shoes or lower limb prostheses, sensing at least pressure force or vertical force, anterior/posterior shear force, and medio/lateral shear force with at least three-axis sensors, storing the 3D kinetic data to a digital memory device, producing a left or right side identified vector quantity with a mobile processor, and wirelessly transmitting the 3D kinetic data at 60 Hz or greater with a transceiver to a computer with a processor and a transceiver;
    b) obtaining 3D kinematic data as the person ambulates with at least one video camera that video records the person ambulating without markers on the person and in an environment without force-sensing plates;
    c) temporally synchronizing the kinetic data from the pair of force sensors and the kinematic data from the at least one video camera together using the processor of the computer by:
    creating a visual event in the 3D kinematic data captured by the at least one video camera and a force event in the 3D kinetic data sensed by at least one of the pair of force sensors; or
    sending a time signal from the computer to the pair of force sensors and the pair of force sensors transmitting a time-stamped vector quantity to the computer; and
    d) simultaneously outputting the 3D kinetic data and the 3D kinematic data, and saving the 3D kinetic data and the 3D kinematic data together as a data file.

2. The method in accordance with claim 1, further comprising:
    orienting a foot segment coordinate system of either of the pair of force sensors with a foot segment coordinate system of the lab space of the video camera by aligning a foot space force vector reported by one of the pair of sensors with a lab space vertical axis created by the video camera.

3. The method in accordance with claim 1, wherein the patient is an amputee; and further comprising:
    adjusting segment mass properties based on both visual blob segment distribution and choice of prosthesis by realigning mass distribution between a standard mass distribution of a non-amputee and mass distribution of the amputee with the prosthesis.

4. The method in accordance with claim 1, further comprising:
    rendering the video recording of the person ambulating into a three-dimensional stick figure with a plurality of segments representative of a skeletal model of the person.

5. The method in accordance with claim 4, further comprising:
    performing Intersegmental Dynamics Analysis (IDA) on a computer model based on the kinematic, the kinetic and segment data by applying joint moments to determine subsequent acceleration of the computer model; and
    performing Acceleration Analysis (AA) to compute a contribution of net joint moments to forward propulsion of the person.

6. The method in accordance with claim 5, comprising:
    displaying a video recording of the person ambulating, or a rendering of the video recording of the person ambulating as a three-dimensional stick figure with a plurality of segments representative of a skeletal model of the person, with data from the IDA and AA overlaid on one another.

7. The method in accordance with claim 1, further comprising:
    arranging a plurality of video cameras at a predetermined spatial volume; and
    calibrating the plurality of video cameras by recording an initial predetermined pose of the person.

8. The method in accordance with claim 1, further comprising:
    arranging the pair of foot sensors on the person's ankles, feet, shoes or lower limb prostheses; and
    calibrating the pair of foot sensors by zeroing the pair of foot sensors and having the person stand on a scale, one foot at a time sequentially.

9. The method in accordance with claim 1, further comprising:
    creating a patient history file comprising patient information including patient height, patient weight, patient mass distribution and patient body fat; and
    saving the patient information together with the data file of the kinetic data and the kinematic data.

10. The method in accordance with claim 1, further comprising:
    analyzing the kinetic data and the kinematic data together; and
    reporting analysis of the kinetic data and the kinematic data.

11. The method in accordance with claim 1, further comprising:

displaying a video recording of the person ambulating, or a rendering of the video recording of the person ambulating as a three-dimensional stick figure with a plurality of segments representative of a skeletal model of the person, with the kinetic data measured by either of the pair of force sensors overlaid one another.

12. A system for analyzing movement of a person, the system comprising a pair of 3D force sensors configured to be affixed to a person's ankles, feet, shoes or lower-limb prosthesis and configured to measure 3D kinetic data as the person ambulates, each of the pair of 3D force sensors comprising an at least three-axis sensor capable of sensing at least pressure force or vertical force, anterior/posterior shear force, and medio/lateral shear force, a digital memory device capable of storing the 3D kinetic data, a mobile processor capable of producing a left or right side identified vector quantity, a transceiver capable of wirelessly transmitting the 3D kinetic data at 60 Hz or greater a computer with one or more processors and a transceiver; at least one video camera configured to record markerless 3D kinematic data as the person ambulates in an environment without force-sensing plates; and the one or more processors configured to:
temporally synchronize the kinetic data from the pair of force sensors and the kinematic data from the at least one video camera together from a visual event created in the 3D kinematic data captured by the at least one video camera and a force event created in the 3D kinetic data sensed by at least one of the pair of force sensors, or from a time signal sent from the computer to the pair of force sensors and a time-stamped vector quantity transmitted from the pair of 3D force sensors to the computer.

13. The system in accordance with claim 12, wherein the one or more processors is further configured to:
orient a foot segment coordinate system of either of the pair of force sensors with a foot segment coordinate system of the lab space of the video camera by: 1) aligning a foot space vertical force component vector reported by one of the pair of sensors with a vertical axis created by the video camera, and assuming the force vector and vertical axis are parallel during flat foot while ignoring force generation during initial contact and heel off; or 2) rotating a force vector reported by one of the pair of sensors using Euler Conversion matrices to the lab space coordinate system of the video camera.

14. The system in accordance with claim 12, wherein the one or more processors is further configured to:
adjust segment mass properties based on both visual blob segment distribution and choice of prosthesis by realigning mass distribution between a standard mass distribution of a non-amputee and mass distribution of the amputee with the prosthesis.

15. The system in accordance with claim 12, wherein the one or more processors is further configured to:
render the video recording of the person ambulating into a three-dimensional stick figure with a plurality of segments representative of a skeletal model of the person;
perform Inverse Dynamics on a computer model based on the kinematic, the kinetic and segment data to calculate 3D joint forces and moments;
perform Intersegmental Dynamics Analysis (IDA) on a computer model based on the kinematic, the kinetic and segment data by applying joint moments to determine subsequent acceleration of the computer model; and
perform Acceleration Analysis (AA) to compute a contribution of net joint moments to forward propulsion of the person.

16. The system in accordance with claim 12, wherein the one or more processors is further configured to:
display a video recording of the person ambulating, or a rendering of the video recording of the person ambulating as a three-dimensional stick figure with a plurality of segments representative of a skeletal model of the person, with the kinetic data measured by either of the pair of force sensors overlaid on one another.

17. A mobile gait lab system, the system comprising:
a) a pair of force sensors configured to be removably affixed to a person's ankles, feet, shoes or lower-limb prosthesis and configured to measure kinetic data as the person ambulates, each of the pair of force sensors comprising:
an at least 3-axis ground reaction sensor configured to sense at least: 1) pressure force or vertical force, 2) anterior/posterior shear force, 3) medio/lateral shear force, and 4) torque or moment exerted between the person's ankles, feet, shoes or lower-limb prosthesis and a support surface about a first vertical axis;
b) a plurality of video cameras configured to record markerless kinematic data as the person ambulates in an environment without force-sensing plates, the plurality of video cameras being removably disposed about a predetermined spatial volume;
c) a computer with one or more processors configured to:
temporally synchronize the kinetic data and the kinematic data together from a visual event created in the kinematic data captured by the plurality of video cameras and a force event created in the kinetic data sensed by at least one of the pair of force sensors, or from a time signal sent from a computer to the pair of force sensors and a time-stamped vector quantity produced by the mobile processor and transmitted from the pair of force sensors to the computer.

18. The system in accordance with claim 17, wherein each of the pair of force sensors further comprises:
a) a housing;
b) a battery port with an opening;
c) a rechargeable battery insertable through the opening and into the battery port;
d) an attachment coupled to the housing and configured to attach the housing to the person's ankles, feet, shoes or lower-limb prosthesis;
e) a digital memory device disposed in the housing;
f) one or more mobile processors disposed in the housing and coupled to one of the pair of force sensors, and configured to receive force signals, convert analog s to digital signals, filter the signals, amplify the signals, condition the signals, compensate the signals and/or calibrate the signals; and
g) a wireless transceiver disposed in the housing and coupled to the one or more mobile processors.

19. The system in accordance with claim 18, wherein the one or more mobile processors are configured to produce a time-stamped, left- or right-side identified, 7-axis vector quantity; and wherein the one or more mobile processors and the wireless transceiver are configured to transmit the vector quantity at 60 Hz or greater.

* * * * *